(12) United States Patent
Tanaka et al.

(10) Patent No.: US 6,251,981 B1
(45) Date of Patent: Jun. 26, 2001

(54) POLYALKOXYSILOXANE COMPOUNDS, PROCESS FOR PRODUCING THE SAME, AND COATING COMPOSITION CONTAINING THE SAME

(75) Inventors: Seiichiro Tanaka; Takeshi Sawai; Hiroshi Kobayashi; Kenji Ooba; Makiko Sekiguchi, all of Kitakyushu; Nobuyuki Matsuzoe; Haruo Katsumata, both of Tokyo, all of (JP)

(73) Assignee: Mitsubishi Chemical Company

( * ) Notice: Subject to any disclaimer, the term of this patent is extended or adjusted under 35 U.S.C. 154(b) by 0 days.

(21) Appl. No.: 09/367,416

(22) PCT Filed: Feb. 16, 1998

(86) PCT No.: PCT/JP98/00623

§ 371 Date: Nov. 8, 1999

§ 102(e) Date: Nov. 8, 1999

(87) PCT Pub. No.: WO98/36016

PCT Pub. Date: Aug. 20, 1998

(30) Foreign Application Priority Data

| Feb. 14, 1997 | (JP) | 9-030394 |
| Jun. 20, 1997 | (JP) | 9-164054 |
| Oct. 22, 1997 | (JP) | 9-289705 |
| Oct. 22, 1997 | (JP) | 9-289710 |
| Oct. 22, 1997 | (JP) | 9-289711 |

(51) Int. Cl.$^7$ ................................................ C08K 3/20
(52) U.S. Cl. ............................................ 524/457; 556/458
(58) Field of Search ............................ 556/458; 524/457

(56) References Cited

FOREIGN PATENT DOCUMENTS

| 0 771 835 A2 | 5/1997 | (EP) . |
| 0 890 597 A1 | 1/1999 | (EP) . |

OTHER PUBLICATIONS

Patent Abstract of Japan, Publication No. 07048454; Publication Date: Feb. 21, 1995.
Patent Abstract of Japan, Publication No. 09012583; Publication Date: Jan. 14, 1997.

*Primary Examiner*—Edward J. Cain
(74) *Attorney, Agent, or Firm*—Dike, Bronstein, Roberts, & Cushman, IP Group; Edwards & Angell LLP; David G. Conlin (57) ABSTRACT

The following polyalkoxysiloxane compounds (A) and (B):

(A): polyalkoxysiloxane compounds represented by the rational formula $SiO_x(OR^1)_y(OR^2)_z$, wherein $z/(y+z)=$ 0.05 to 0.5 by mole, $0.5 \leq x \leq 1.5$, $2x+y+z=4$, $R^1$ is a methyl group and/or an ethyl group, and $R^2$ is an organic group different from $R^1$;

(B): polyalkoxysiloxane compounds represented by the rational formula $SiO_x(OR^1)_y(OR^2)_z$, wherein $0.5 \leq x \leq 1.5$, $2x+y+z=4$, $R^1$ is a methyl group and/or an ethyl group, and $R^2$ is at least one of the alkyl groups having 3 to 4 carbon atoms; are provided.

These polyalkoxysiloxane compounds can be used advantageously for the coat-forming compositions or aqueous emulsion-forming compositions.

17 Claims, 1 Drawing Sheet

POLYALKOXYSILOXANE COMPOUNDS, PROCESS FOR PRODUCING THE SAME, AND COATING COMPOSITION CONTAINING THE SAME

TECHNICAL FIELD

The present invention relates to the novel polyalkoxysiloxane compounds which, when blended in the existing coatings, coating solutions or resin compositions containing fillers such as various types of powders, do not affect their storage stability and compatibility of the components and are capable of, or useful for, providing such functions as stain resistance, weather resistance, scratch resistance, acid resistance, heat resistance, water resistance and solvent resistance to the coats or coating films.

The present invention also relates to the novel aqueous emulsion-forming compositions containing the said polyalkoxysiloxane compound of the present invention, which, when blended in the existing water-based coatings or aqueous coating solutions, can maintain storage stability and compatibility and are capable of providing such functions as stain resistance and weather resistance to the obtained coats or coating films.

BACKGROUND ART

Recently, low-molecular weight polyalkoxysiloxane compounds having alkoxyl groups, such as those obtained from partial hydrolysis/condensation of tetramethoxysilane, tetraethoxysilane, tetrabutyoxysilane or the like, are used with increasing popularity in the industries. For instance, "MKC Silicate MS51" and "MKC Silicate MS56" are produced and sold by Mitsubishi Chemical Corporation as partial hydrolysis/condensation products of tetramethoxysilane. These partial hydrolysis/condensation products of tetramethoxysilane are added to the existing coatings, coating solutions to be applied for surface treatment of powders and various other types of bases, and resin compositions containing fillers such as inorganic powders, for the purpose of providing the useful functions such as stain resistance, weather resistance, scratch resistance, acid resistance and heat resistance to the coats or coating films.

However, addition of such partial hydrolysis/condensation products of tetramethoxysilane to the coatings, coating solutions or resin compositions may affect their storage stability. Specifically, such addition is causative of such problems as increase of viscosity and inducement of caking of the coatings or coating compositions during storage or in the course of preparation thereof.

"Ethyl Silicate ES40" Colcoat Co., Ltd. etc., as partial hydrolysis/condensation products of tetraethoxysilane, and "MKC Silicate BTS" (Mitsubishi Chemical Corporation), etc., as partial hydrolysis/condensation products of tetrabutoxysilane are commercially produced and sold. These alkoxysilanes and their partial hydrolysis/condensation products have little probability of causing rise of viscosity or caking when added to the said coatings. In some cases, however, they fail to show their effect of providing the envisioned functions, such as stain resistance, scratch resistance, heat resistance, etc., to the finally obtained coats. Especially, the coats would prove unsatisfactory in hardness.

It has been desired to offer the partial hydrolysis/condensation products of alkoxysilane compounds which, when blended in coatings, can maintain or improve their storage stability and compatibility and also contribute to providing such functions as stain resistance, weather resistance, scratch resistance, acid resistance and heat resistance to the finally obtained coats or coating films.

Especially when these alkoxysilanes or their partial hydrolysis/condensation products are blended in the water-based coatings, there would arise such problems as reduced compatibility of the components, increase of viscosity, gelation, and even cissing in the coats or coating films, resulting in marred appearance of the coats, and these problems have been a bar to utilization of the said products for water-based coatings. In recent years, solvent-based coatings has been changed to water-based ones for the benefit of environmental protection and safety, and accordingly it has been required to provide the partial hydrolysis/condensation products of alkoxysilane compounds which, when blended in water-based coatings, won't impair their storage stability and show an outstanding effect in providing such functions as stain resistance, weather resistance, scratch resistance, acid resistance, water resistance and solvent resistance to the coats.

DISCLOSURE OF THE INVENTION

As a result of the present inventors' earnest studies to solve the above subject matter, it has been found that the polyalkoxysiloxane compounds represented by a specific rational formula have an excellent effect in developing the functions such as stain resistance of the coats, and also contribute to maintaining storage stability in the liquid state when blended with various types of component materials. It has been further found that these polyalkoxysiloxane compounds are capable of maintaining a stable liquid state even when far increased in molecular weight in comparison with the partial hydrolysis/condensation products of various types of tetraalkoxysilanes which have been available as polyalkoxypolysiloxanes.

The present invention has been attained on the basis of the above finding, and its aspects are shown as follows.

In the first aspect of the present invention, there are provided polyalkoxysiloxane compounds represented by the rational formula: $SiO_x(OR^1)_y(OR^2)_z$, wherein $z/(y+z)=0.05$ to 0.5 by mole, $0.5 \leq x \leq 1.5$, $2x+y+z=4$, $R^1$ is a methyl group, an ethyl group or mixture thereof, and $R^2$ is an organic group different from $R^1$.

In the second aspect of the present invention, there are provided polyalkoxysiloxane compounds represented by the rational formula: $SiO_x(OR^1)_y(OR^2)_z$, wherein $0.5 \leq x \leq 1.5$, $2x+y+z=4$, $R^1$ is a methyl group and/or an ethyl group, and $R^2$ is at least one of the alkyl groups having 3 to 4 carbon atoms.

In the third aspect of the present invention, there are provided the polyalkoxysiloxane compounds whose haze factor A is not more than 2.0.

In the fourth aspect of the present invention, there is provided an aqueous emulsion-forming composition comprising component (A) of a polyalkoxysiloxane compound represented by the rational formula $SiO_a(OR^1)_b(OR^2)_c$, and component (B) of a nonionic surfactant, wherein $0.5 \leq a \leq 1/4$, $c/(b+c)=0.05$ to 0.5, $2a+b+c=4$, $R^1$ is a methyl group or an ethyl group, and $R^2$ is an organic group different from $R^1$.

In the fifth aspect of the present invention, there is provided an aqueous emulsion-forming composition comprising:

component (A) of a polyalkoxysiloxane compound represented by the rational formula $SiO_a(OR^1)_b(OR^2)_c$ component (B) of an organic solvent having a solubility parameter (SP) of not more than 9.5, and component (C) of a nonionic surfactant, wherein $0.5 \leq a \leq 1.4$, $c/(b+c) = 0.05$ to $0.5$, $2a+b+c=4$, $R^1$ is a methyl group or an ethyl group, and $R^2$ is an organic group different from $R^1$.

The present invention is described in detail below.

First, the first to third aspects of the present invention pertaining to the polyalkoxysiloxane compounds are explained.

The polyalkoxysiloxane compounds of the present invention are represented by the rational formula $SiO_x(OR^1)_y(OR^2)_z$. The "polyalkoxysiloxane compounds" referred to in the present invention are compounds having as their backbone a siloxane skeleton represented by the formula $(Si-O)_n$, with an alkoxyl group attached to the Si atom. The said siloxane skeleton may be linear, cyclic or branched.

The polyalkoxysiloxane compounds of the present invention are usually provided as a composition having a molecular weight distribution, but it is essential that the composition of these compounds be represented by the above-shown rational formula.

When $x<0.5$ in the above formula, the compounds may be unsatisfactory in their effect of providing the specific functions to the coats when the compounds are blended in an existing coating, coating solution or filled resin composition and used for coating. Also, such compounds are low in the degree of condensation on the average, low in molecular weight and high in content of the low-boiling point (not more than 200° C.) components. Therefore, when a coat is formed with a coating preparation obtained by blending such compounds in an available coating and baking and hardening the composition at a temperature not less than 100° C., the low-boiling point components tend to volatilize and become less likely to remain as an effective component in the coat. Further, the volatilized matter may pose the problem of the aggravated working environment. On the other hand, when $x>1.5$, the obtained polyalkoxysiloxane compound has too high viscosity and tends to gel, resulting in deteriorated storage stability of the coating. Further, compatibility of the compound with the resin moiety lowers, making it difficult to obtain a homogeneous coating composition or film-forming composition.

The value of x is preferably $0.7 \leq x \leq 1.4$, more preferably $0.9 \leq x \leq 1.3$. When a polylkoxysiloxane compound of the present invention, meeting the above conditions, is blended in an existing coating and used for forming a coat, the coating workability is improved and also the effect of developing the functions such as stain resistance, weather resistance, scratch resistance, acid resistance, etc., of the obtained coat is maximized. Further, reproducibility of these characteristics is bettered.

$R^1$ is a methyl group and/or an ethyl group, and $R^2$ is an organic group different from $R^1$. That is, the polyalkoxysiloxane compounds of the present invention has at least one of methyl group and ethyl group as $R^1$ and at least one of the organic groups different from $R^1$ as $R^2$, and each of $R^1$ and $R^2$ may represent a plural number of groups.

Since $R^1$ is a methyl group and/or an ethyl group, when the coat formed with a coating preparation having a compound of the present invention blended therein is left exposed in the open air, the compound is easily hydrolyzed with humidity in the air to form SiOH groups, making a hydrophilic coating film with high stain resistance, especially raindrop stain resistance.

When $R^1$ is an alkyl group having a more number of carbon atoms than ethyl group ($C_2$), the obtained coat may be unsatisfactory in stain resistance, especially raindrop stain resistance. This is considered attributable to excessive dilatoriness in formation of SiOH groups in outdoor exposure of the coat due to insufficient hydrolysis of the compound. $R^1$ is most preferably a methyl group, in which case the stain resistance providing effect is most remarkable.

$R^2$ is preferably at least one of n-propyl group, isopropyl group, n-butyl group and isobutyl group. Especially preferably, $R^2$ is at least one of alkyl groups having 3 or 4 carbon atoms in view of the improvements of compatibility with the resin moiety and storage stability of the coating composition. It is considered that when $R^1$ and $R^2$ have a specified range of ratio as shown below, $R^2$ with high organic nature has a function to improve compatibility with the highly organic materials such as coating resins, while storage stability of the coating composition containing an organic resin and a pigment is improved because of low hydrolysis reactivity or condensation reactivity of the alkoxyl group. It should be noted, however, that when $R^2$ has a more number of carbon atoms that specified above, the functions such as stain resistance, weather resistance, scratch resistance, etc., of the coat formed with a coating film-forming composition or coating composition containing a polyalkoxysiloxane compound are badly deteriorated. It is, therefore, especially preferable that $R^2$ is a butyl group, particularly an n-butyl group for development of the said functions.

$R^1$ and $R^2$ can be properly selected according to the purpose of use of the polyalkoxysiloxane compounds of the present invention. That is, when a polyalkoxysiloxane compound of the present invention is blended in various types of coatings as described below, $R^1$ and $R^2$ are selected in view of compatibility with the resin moiety in the coating, its storage stability and desired functions such as stain resistance of the coat to be formed.

The ratio of $R^2$ to the sum of $R^1$ and $R^2$, expressed by $z/(y+z)$, preferably falls in the range of from 0.05 to 0.5, more preferably from 0.1 to 0.3 by mole.

When a polyalkoxysiloxane compound with $z/(y+z)<0.05$ is blended in an existing coating, coating solution or resin composition containing filler such as various types of powder, the obtained blend is bad in storage stability and tends to suffer from such problems as increase of viscosity and gelation.

On the other hand, when a polyalkoxysiloxane compound with $z/(y+z)>0.5$ is blended in an existing coating, coating solution or resin composition containing filler such as various types of powder, the obtained coat is bad in stain resistance, weather resistance, scratch resistance, acid resistance.

Especially when a polyalkoxysiloxane compound of the present invention which meets both conditions of $0.9 \leq x \leq 1.5$ and $z/(y+z) = 0.05$ to $0.5$ (but $2x+y+z=4$) is blended in the said coatings, the blend shows very high storage stability and also the effect of the compound in developing the said functions of the coat is most remarkable. The factors x, y and z can be determined in the following way.

(1) —$OR^1$ and —$OR^2$ attached to the Si atoms are each determined by $^1$H-NMR analysis using tetrabromoethane as internal standard and expressed as y' (mol/kg) and z' (mol/kg), respectively. In case where the amounts of $R^1OH$ and $R^2OH$ are not negligible, the amounts of $R^1OH$ and $R^2OH$ are determined by gas chromatography and deducted from y' and z'.

(2) The silica concentration determined by silica analysis (gravimetric technique: hydrolytic calcination) is expressed as x' (wt %).

(3) Calculation of x, y and z:
   y=(y'×60.1)/(x'×10)
   z=(z'×60.1)/(x'×10)

From 2x+y+z=4, x=(4−(y+z))/2, x may be determined by Si-NMR analysis.

The molecular weight (weight-average molecular weight) of the polyalkoxysiloxane compounds of the present invention is preferably within the range of 260 to 5,000, more preferably 500 to 4,500, most preferably 900 to 4,000. When the weight-average molecular weight of the said compounds is less than 260, the content of the tetraalkoxysilane (monomer) becomes too high, and particularly in the case of tetramethoxysilane, care must be required in handling thereof because of high toxicity of this substance, and sufficient equipment to secure safety of the worker is required. On the other hand, when the weight-average molecular weight of the polyalkoxysiloxane compound is more than 5,000, the blend is increased in viscosity and becomes liable to gel, resulting in sharply reduced storage stability. Further, compatibility with the resin moiety may be deteriorated, making it difficult to obtain a homogeneous coating composition or film-forming composition.

The polyalkoxysiloxane compounds of the present invention having a weight-average molecular weight in the range of 260 to 5,000 are a liquid with a viscosity of 3 to 500 cp at 25° C., which has good storage stability and is easy to handle and also easy to blend in the coatings.

The weight-average molecular weight referred to in the present invention was determined based on the measurements by GPC using polypropylene glycol as standard and converted to polymethoxysiloxane equivalent. Of the conventionally available polymethoxysiloxane compounds such as MS51 and MS56, those having a molecular weight of not less than 1,000 require addition of a large amount of water for attaining increase of molecular weight in hydrolysis/condensation of tetramethoxysilane. By addition of a large amount of water, the obtained polymethoxysiloxane compound tend to increase in viscosity or to gel, making it difficult to obtain a stable liquid compound. Thus, the polyalkoxysiloxane compounds of the present invention are quite epochal in that they are capable of increase of molecular weight, and they may be blended in a coating in the form of a silica-rich material with high storage stability to form an organic/inorganic composite coating film provided with such functions as stain resistance, weather resistance, scratch resistance and acid resistance.

The degree of hydrophilicity and hydrophobicity of the polyalkoxysiloxane compounds of the present invention, as indicated in terms of haze factor A (ml), is preferably not more than 2.0, more preferably not more than 1.5.

The compounds whose haze factor A exceeds 2.0 tend to cause an increase of viscosity or gelation of the blends when the compounds are blended in the coatings, and there arises the problem of reduced storage stability. Also, when a coat is formed by using such compounds, since their effect of developing the functions such as stain resistance tends to stay low, it becomes necessary to increase the amount of the compound to be blended, causing a tendency for the blend to lower in storage stability.

The smaller the haze factor A is, the higher becomes hydrophobicity of the compound. The said haze factor A needs to be controlled properly as it provides an important index of compatibility among the components in various types of coating compositions, such as water-based paints, containing the organic components.

In the present invention, it was realized to properly control the haze factor A of the polyalkoxysiloxane compounds so that it would remain not more than 2.0 by defining the molecular weight and $R^2$ in the specified ranges. Therefore, these compounds are very useful in application to the coating compositions.

The haze factor A is determined in the following way according to the conventional method [Ichiro Nishi et al: Handbook of Surface Active Agents, Clauses 324 and 325, Sangyo Tosho, Ltd. (1965)].

2.5 g of the sample to be determined (a siloxane compound) was weighed out, to which ethanol (special grade) was added to make the total volume 25 ml (using a 25 ml graduated flask). Then 5 ml of this solution was pipetted into a 50 ml beaker, kept at the fixed temperature of 25° C. and titrated with a 2% aqueous phenol solution using a 25 ml buret while stirring the solution (using a magnetic stirrer). The moment when the solution became turbid was supposed to be the end point, and the number of ml of the 2% aqueous phenol solution required for the titration was expressed as haze factor A.

Preparation of Polyalkoxysiloxane Compounds

The preparation method of the polyalkoxysiloxane compounds of the present invention is not specified, but the following three processes are typical.

(1) A tetraalkoxysilane represented by the formula $Si(OR^1)_4$ (wherein $R^1$ is a methyl group and/or an ethyl group) is reacted with water at a temperature not more than 80° C. to effectuate hydrolysis/condensation of the compound, and then an alcohol, preferably a $C_{3-4}$ alkyl alcohol ($R^2OH$) having one OH group is added to the hydrolysis/condensation product to conduct ester exchange reaction with the alkoxyl groups possessed by the hydrolysis/condensation product.

(2) Water is added to a mixture of a tetraalkolxysilane represented by the formula $Si(OR^1)_4$ (wherein $R^1$ is a methyl group and/or an ethyl group) and an alcohol, preferably at least one of the $C_{3-4}$ alkyl alcohols ($R^2OH$) having one OH group, to carry out hydrolysis/condensation reaction and ester exchange reaction.

(3) Water is added to a tetraalkoxysilane represented by the formula $Si(OR^1)_n(OR^2)_{4-n}$ (wherein $R^1$ is a methyl group and/or an ethyl group, and $R^2$ is an organic group different from $R^1$, preferably at least one of the $C_{3-4}$ alkyl groups) to carry out hydrolysis/condensation reaction.

In any of the above processes (1) to (3), water is added to the starting material tetraalkoxysilane in an amount of 0.6 to 1.6 mole to one mole of tetraalkoxysilane to carry out hydrolysis/condensation reaction. The molecular weight of the finally obtained polyalkoxysiloxane compound can be controlled by adjusting the amount of water added; it is possible to obtain a polyalkoxysilane compound having a molecular weight in the range specified in the present invention by carrying out hydrolysis/condensation reaction by adding water to a tetraalkoxysilane in an amount of 0.6 to 1.6 mole to one mole of tetraalkoxysilane. When the amount of water added is less than 0.6 mole, there tend to arise the problems that the produced polyalkoxysiloxane compound tends to have a weight-average molecular weight smaller than 260, and that the residual amount of the unreacted tetraalkoxysilane increases. On the other hand, when the amount of water added exceeds 1.6 mole, the produced polyalkoxysiloxane compound tends to have a weight-average molecular weight more than 5,000, and there may also take place a sharp rise of viscosity and gelation, giving rise to the problem in storage stability of the product.

A solvent may be introduced into the hydrolysis/condensation reaction system. A water-soluble organic solvent such as an alcohol, an ether or a ketone is preferably used.

In the process (1), as it is undesirable to cause change of the properties through ester exchange with the tetraalkoxysilane or its hydrolysis/condensation reaction product, it is preferable to use a solvent which takes no part in ester exchange or an alcohol of the same type as the alcohol which is formed as a by-product from hydrolysis. It is more preferable to use the by-product alcohol itself as solvent.

In the process (2), since both of the starting material tetraalkoxysilane and the alkyl alcohol ($R^2OH$) to be ester exchanged are supplied from the start, no solvent is used, or when a solvent is used, it is preferable to use the same alcohol as formed as a by-product in hydrolysis/condensation reaction of the tetraalkoxysilane or ester exchange reaction, or a solvent which takes no part in ester exchange with the tetraalkoxysilane, for example, a water-soluble organic solvent such as an ether or a ketone.

The solvent used in the process (3) is the same solvent as explained in the process (2).

The amount of the solvent to be used is usually 0.1 to 10 times, preferably 0.1 to 5.0 times the amount of the tetraalkoxysilane by weight.

In conducting hydrolysis and condensation reaction, a catalyst may be used optionally for allowing smooth proceeding of the reaction. As the catalyst, there can be used inorganic acids such as hydrochloric acid, sulfuric acid and phosphoric acid, organic acids such as carboxylic acids and sulfonic acid, and alkalis such as ammonia and sodium hydroxide, but hydrochloric acid is preferred as it can be easily removed after completion of the reaction. The amount of hydrochloric acid to be used, calculated as HCl, is usually $1 \times 10^{-6}$ to $1 \times 10^{-1}$ moles, preferably $1 \times 10^{-5}$ to $1 \times 10^{-2}$ moles based on one mole of tetraakoxysilane.

The temperature at which the reaction is carried out after addition of water to tetraalkoxysilane is adjusted to be not more than 80° C.; preferably the reaction is conducted at a temperature below the boiling point of the alcohol produced in the hydrolysis/condensation reaction of tetraalkoxysilane and/or the ester exchange reaction. In case of using a catalyst, the reaction is preferably carried out at a temperature below the boiling point of the catalyst used. For instance, in the case of tetramethoxysilane, the reaction is preferably conducted at a temperature below the boiling point of methanol, and in the case of tetraethoxysilane, it is preferable to carry out the reaction at a temperature below the boiling point of ethanol. It is more preferable and more practical to carry out the reaction at the boiling point of the by-product alcohol or the reaction solvent used and under reflux for allowing the hydrolysis/condensation reaction and/or ester exchange reaction to proceed quickly. For instance, the reaction temperature is not more than 66° C. in the case of tetramethoxysilane and not more than 80° C. in the case of tetraethoxysilane. When the temperature is lower than the above mentioned temperature, it is impractical because it retards hydrolysis and condensation reaction. On the other hand, when the temperature is higher than the above mentioned temperature, practice of the reaction under pressure is required, in which case provision of pertinent equipment is essential.

According to the present invention, in the process (1), an alcohol, preferably a $C_{3-4}$ alkyl alcohol having one OH group ($R^2OH$) is added to the hydrolysis/condensation reaction product of tetraalkoxysilane. Typical examples of such alkyl alcohols are n-propanol, 2-propanol, n-butanol, isobutyl alcohol, 2-butanol and 3-butanol. In the process (2), such an alkyl alcohol is supplied along with the starting material tetraalkoxysilane from the start.

In a preferred embodiment of the present invention, the starting materials tetraalkoxysilane and alkyl alcohol ($R^2OH$) are selected so that an alkyl group having a more number of carbon atoms than the alkyl group ($R^1$) in the alkoxyl group ($—OR^1$) possessed by the starting tetraalkoxysilane will be introduced by ester exchange. This has the effect of optimizing the properties of the produced polyalkoxypolysiloxane in use for coating compositions.

A $C_{3-4}$ alkyl alcohol having one OH group ($R^2OH$) explained above is added to the hydrolysis/condensation reaction product of tetraalkoxysilane to effect ester exchange with the alkoxyl group ($—OR^1$) possessed by the said reaction product. The temperature used for this reaction is not specifically restricted as far as it allows proceeding of ester exchange reaction between the alkoxyl group ($—OR^1$) possessed by the hydrolysis/condensation reaction product of tetraalkoxysilane and the $C_{3-4}$ alkyl alcohol ($R^2OH$). Generally, there is used the same temperature as used for the said hydrolysis/condensation reaction of tetraalkoxysilane.

In the process (1) or (2), the amount of the alcohol, such as a $C_{3-4}$ alkyl alcohol having one OH group ($R^2OH$), added to the reaction system is preferably 0.05 to 2.5 moles, more preferably 0.1 to 1.5 mole based on one mole of tetraalkoxysilane. In the process (3), the ratio of ($OR^2$) to ($OR^1$) in the starting material tetraalkoxysilane is properly decided so that it will fall within the range defined by the rational formula of the polyalkoxysiloxane compounds of the present invention obtained by adding water to a tetraalkoxysilane represented by the formula $Si(OR^1)_n(OR^2)_{4-n}$ (wherein $R^1$ is a methyl group and/or an ethyl group, and $R^2$ is at least one of the $C_{3-4}$ alkyl groups) to carry out hydrolysis/condensation reaction.

When a polyalkoxysiloxane compound of the present invention is blended in a coating, the effect of affording stain resistance to the coat and bettering storage stability of the coating compositions, especially water-based coating compositions, can be maximized.

In case where ester exchange is conducted through reaction with other substance than the said alkyl alcohol, for example, an alcohol having one OH group but possessing more than 4 carbon atoms in the molecule, there tends to arise the problem that the functions such as stain resistance and scratch resistance provided to the coat are unsatisfactory when a polyalkoxysiloxane compound of the present invention is blended in a coating and used for forming a coat.

Also, when it is tried to conduct ester exchange reaction with a compound having 2 or more OH groups in the molecule, there takes place thickening or gelation during the reaction, or increase of viscosity of the product, resulting in its bad storage stability.

The hydrolysis/condensation reaction of tetraalkoxysilane forms, as a by-product, an alcohol ($R^1OH$) corresponding to the alkoxyl group ($—OR^1$) possessed by the tetraalkoxysilane. This by-product alcohol may or may not be evaporated away before conducting ester exchange. There is no problem if the hydrolysis/condensation reaction is further advanced during removal of the by-product alcohol.

Also, the alcohol ($R^1OH$) corresponding to the alkoxyl group ($—OR^1$) of the tetraalkoxysilane, which is formed as a by-product from ester exchange reaction with a $C_{3-4}$ alkyl alcohol having one OH group ($R^2OH$), and/or the reaction solvent may or may not be evaporated away in the course of the ester exchange reaction. There arises no problem even if the hydrolysis/condensation reaction or ester exchange reaction is further advanced during removal of the by-product alcohol.

By the processes described above, it is possible to obtain the polyalkoxysiloxane compounds with excellent properties of the present invention.

It is preferable that the tetraalkoxysilane content in the polyalkoxysiloxane compounds of the present invention is confined to less than 1% by weight. This alleviates the problem of toxicity and is advantageous for working environment. When the tetraalkoxysilane is contained in excess of 1% by weight, the excess portion may be removed by preferable means such as distillation.

Uses

The polyalkoxysiloxane compounds of the present invention are preferred for preparing the coating materials or composite materials by adding them to the existing coatings, coating solutions or resin compositions containing fillers such as various types of powders. That is, it is possible to produce the coat-forming compositions containing the polyalkoxysiloxane compounds of the present invention or to prepare the coating compositions by blending the polyalkoxysiloxane compounds of the present invention in the existing coatings.

As for the content of polyalkoxysiloxane compounds of the present invention, in case where use of these compounds is intended to improve adhesion of the coat to the base to be coated or to improve the functions such as stain resistance and weather resistance of the coat surface, the appropriate content of the said compounds in the coating preparations is not more than 10 parts by weight, preferably 1 to 5 parts by weight based on 100 parts by weight of the nonvolatiles of the coating or coating solution. Thus, the compounds of the present invention are capable of producing the desired effect by use of only a small amount thereof.

Of course, even when a polyalkoxysiloxane compound of the present invention is added to a high concentration exceeding 10 parts by weight to 100 parts by weight of nonvolatiles of the coating, the obtained preparation has excellent storage stability and compatibility in the liquid form, and also the coat formed with such preparation is greatly improved in its properties, particularly heat resistance, scratch resistance and chemical resistance. The appropriate content of the compound in such a case is normally not less than 10 parts by weight, preferably 20 to 100 parts by weight based on 100 parts by weight of nonvolatiles of the coating, especially when it is preferred to improve scratch resistance of the coat.

In order to improve stain resistance of the coat formed with a coating or coating solution containing a polyalkoxysiloxane compound of the present invention, it is preferred to use the compound whose weight-average molecular weight is not less than 1,000, preferably not less than 1,200.

In the case of the conventional partial hydrolysis/condensation product of a polyalkoxysiloxane compound having alkoxyl groups, especially methoxyl groups, for example tetramethoxysilane, when the weight-average molecular weight of the said product is not less than 2,000, the product itself becomes very unstable in storage. In contrast, the polyalkoxysiloxane compounds of the present invention are drastically improved in storage stability of their own. In other words, even if their molecular weight is made more than 2,000, they won't gel and, quite surprisingly, maintain well satisfactory storage stability singly in the liquid state.

Coatings

The compounds of the present invention can be added to the ordinary coatings, which include, for instance, normal-temperature dried type coatings, for example, oil paints such as boiled oil, oil varnish and stand oil, alkyd resin coating, acrylic resin coating, acrylic silicon resin coating, urethane resin coating, fluorine resin coating, phenolic resin coating, epoxy resin ester coating, cashew oil paint and the like.

Bake-dried type coatings include alkyd resin coating, melamine resin coating, amino-alkyd resin coating, phenolic resin coating, epoxy resin coating, polybutoxy resin coating, urethane resin coating, acrylic resin coating, acryhlic silicon resin coating and fluorine resin coating.

The polyalkoxysiloxane compounds of the present invention can also be added to the water-soluble resin coatings, water-dispersed resin coatings and aqueous emulsion resin coatings. These coatings may be commercially available ones. The coats formed with the blended coatings are especially excellent in stain resistance and scratch resistance.

The water-soluble resin coatings include, for instance, acrylic melamine resin coating, polyester-melamine resin coating, polyurethane resin coating and epoxy resin coating. The aqueous emulsion resin coatings include vinyl acetate resin coating, vinyl acetate-acrylic resin coating, vinyl acetate-branched higher fatty acid vinyl ester resin coating, ethylene-vinyl acetate resin coating, acrylic resin coating, acrylic styrene resin coating, acrylic urethane resin coating, acrylic silicon resin coating, polyester resin coating and fluorine resin coating.

The polyalkoxysiloxane compounds of the present invention are added to these coatings in an amount of preferably 1 to 40 parts by weight based on 100 parts by weight of nonvolatile matter of resin. When the amount added is less than 1 part by weight, it is difficult to develop the coat functions, especially stain resistance and scratch resistance, and when the compound amount exceeds 40 parts by weight, the coatings deteriorate in storage stability and the formed coat becomes vulnerable to cracking. The preferred amount range of the compounds of the present invention to be added to the coatings is 2 to 20 parts by weight based on 100 parts by weight of nonvolatile matter of resin. Addition of 2 to 10 parts by weight of the compounds is sufficient for providing stain resistance to the coat.

The pigments that can be blended in the coatings include inorganic pigments, for example, lead compounds such as basic lead carbonate, zinc compounds such as zinc white and lithopone, titanium compounds such as titanium oxide, cobalt compounds such as aureolin, cobalt green, cerulean blue-2, cobalt blue and cobalt violet, iron compounds such as iron oxide, chromium compounds such as chromium oxide, lead chromate and barium chromate, carbon black, etc., and organic pigments which include colored compounds such as water-insoluble phthalocyanine type, dioxazine type, anthraquinone type and quinophthalone type, and their metal-containing compounds. Needless to say, it is possible to use any other compounds which are usable as pigment for the coatings. These compounds may be used singly or as a mixture of two or more of them.

In preparation of a pigmented coating using a polyalkoxysiloxane compound of the present invention, the compound may be blended in a coating in which a pigment has already been dispersed, or the pigment may be added after blending the compound of the present invention in a coating. Also, the pigment may initially be treated with the polyalkoxysiloxane compound. It is of course possible to use a coating containing various types of dye. Known methods and techniques can be used for the coating preparation as far as the polyalkoxysiloxane compound of the present invention are used.

The type of the organic solvent blended in the coatings is not specified in the present invention; it is possible to use, for example, alcohols, glycol derivatives, hydrocarbons, esters, ketones, ethers and the like, either singly or as a mixture of two or more of them.

The alcohols usable for the said purpose include methanol, ethanol, n-propanol, isopropanol, n-butanol, isobutanol, octanol, acetyl acetone alcohol and the like. The glycol derivatives include ethylene glycol, ethylene glycol monomethyl ether, ethylene glycol monoethyl ether, ethylene glycol mono-n-propyl ether, ethylene glycol mono-n-butyl ether, diethylene glycol monomethyl ether, diethylene glycol monoethyl ether, propylene glycol monomethyl ether, propylene glycol monoethyl ether, propylene glycol monobutyl ether, ethylene glycol monomethyl ether acetate, ethylene glycol monoethyl ether acetate, propylene glycol monomethyl ether acetate, propylene glycol monoethyl ether acetate and the like.

The hydrocarbons include benzene, toluene, xylene, etc. The esters include methyl acetate, ethyl acetate, n-butyl acetate, isobutyl acetate, methyl acetoacetate, ethyl acetoacetate, etc. The ketones include acetone, methyl ethyl ketone, methyl isobutyl ketone, acetyl acetone, etc. The ethers include ethyl ether, butyl ether, dioxane, tetrahydrofuran, etc. The coatings in which a polyalkoxysiloxane compound of the present invention has been blended as described above can be applied to various types of base to form a coat having specific properties such as stain resistance and weather resistance.

Further, because of excellent compatibility of the compounds of the present invention with various types of resin, the formed coat is also enhanced in hardness and homogeneity. Of course, it is possible to blend a compound of the present invention itself in the said solvents, or to add water to the compound to make a hydrolytic liquid composition and use it for forming a silica coat. In this case, the content of the solvent is usually 10 to 5,000 parts by weight, preferably 25 to 1,000 parts by weight, more preferably 50 to 500 parts by weight based on 100 parts by weight of the polyalkoxysiloxane compound. When the solvent content is less than 10 parts by weight, the produced liquid composition is rather low in storage stability and becomes liable to gel. On the other hand, when the solvent content exceeds 5,000 parts by weight, the silica coat formed with this composition is excessively small in thickness.

Silicon-Rich Coats

As stated above, a polyalkoxysiloxane compound of the present invention can be blended as a silicon component with various types of organic compound to prepare a liquid silicon-containing composition, and such a composition can be applied as a coating solution to various types of base to be coated. That is, a polyalkoxysiloxane compound of the present invention can be blended with other organic compounds to make silicon-containing compositions. By using such silicon-containing compositions, it is possible to obtain coats with a high silicon content, or silicon-rich coats. The amounts of the organic compound and the polyalkoxysiloxane compound used in the above preparation are preferably selected such that usually the organic compound is in the range of 1 to 400 parts by weight based on 100 parts by weight of the polyalkoxysiloxane compound, calculated as nonvolatiles. When the organic compound/polyalkoxysiloxane compound ratio falls within the above-defined range, it is possible to develop such properties as high hardness and high heat resistance possessed by the polyalkoxysiloxane compound. In this preparation, the $SiO_2$-reduced concentration of the polyalkoxysiloxane compound in the nonvolatiles of the blend preferably falls within the range of 10 to 95% by weight.

The organic compound to be blended with a polyalkoxysiloxane compound of the present invention is not specified but may be properly selected according to the intended use of the produced coating. In case where an organic compound is used for preparing a silicon-rich liquid composition such as mentioned above, it is preferable to select the compounds having good compatibility with the polyalkoxysiloxane compounds of the present invention, particularly those having a group capable of condensing the methoxyl group of the polyalkoxysiloxane compounds of the present invention, or a group condensable with the methoxyl group through hydrolysis. Examples of such compounds are silane coupling agents (usually those represented by the formula $RSiX_3$ wherein X is a hydrolytic group, and R is an organic group; typical examples being methacrylate type, epoxy type, amine type, vinyl type and mercapto type), alkylalkoxysilicones, polymers such as acrylic resins, acrylic silicone resins, epoxy resins, polyester resins, urethane resins and fluorine resins, which have 2 or more of the said groups or epoxy structures, and polyhydric alcohols such as 1,4-butanediol, glycerin, catechol and resorcin.

The respective components in the blend, especially the polyalkoxysiloxane compound and the said organic compound, may exist in a condensed state in the liquid or in a simply mixed state. Such state of the components may be properly selected according to the type of the organic compound used and the purpose of use of the product. The condensation reaction can be accelerated by eliminating the by-product alcohol out of the reaction system.

The polyalkoxysiloxane compound of the present invention and the said organic compound can be brought into a compatibilized state by adding a solvent or a dispersing medium in the blend to form a liquid composition (the term "compatibilized state" used here means a homogeneous state in appearance, and it does not matter whether the siloxane compound is dissolved or dispersed). In the case of certain types of organic compound, such a compatibilized state can be produced by allowing the blend to stand for a given period of time and then stirring.

Coating Materials for Outer Walls and Topcoats for Sizing Materials

The polyalkoxysiloxane compounds of the present invention can be blended with various types of resins to prepare the coating materials, which can be applied to various types of base. Especially, by applying a conventional organic resin type coating to a sizing material used as a building material for external walls, and then further applying a topcoating containing a polyalkolxysiloxane compound of the present invention, it is possible to obtain an external wall coat having high hardness and stain resistance as well as a good esthetic appearance. Further, since the raindrop stain preventive effect of the polyalkolxysiloxane is derived, the labor required for the maintenance is greatly lessened and a very excellent building material is provided. The resins to be blended with the polyalkoxysiloxane compounds of the present invention to prepare the said coatings are not specified; it is possible to use, for example, organic resins such as acrylic resins, acrylic rubber resins, urethane resins, polyester resins, epoxy resins, acrylic urethane resins, urethane rubber, acrylic silicone resins, fluorine resins, etc. Those having elasticity are preferred.

The ratio of the polyalkoxysiloxane compound to the resin moiety should be not more than 20 parts by weight, preferably approximately 1 to 10 parts by weight based on 100 parts by weight of the resin, calculated as nonvolatiles.

The thus obtained topcoat, when applied to a sizing material, shows very high adhesion. The sizing materials to which the coating compositions according to the present invention can be applied as topcoat include ceramic sizing materials and metallic sizing materials. Topcoating of the present invention is also preferred for application to exterior cladding tiles. The ceramic sizing materials include magnesium carbonate sheets, hard excelsior boards, wood fiber-filled cement calciumsilicate-molded plates, pulp-mixed cement molded plates and the like. The scope of application of topcoating of the present invention is not limited to these uses.

The types of outer wall coating include inorganic coating, fluorine coating, color shade coating, sand coating, aggregate-filled coating, sputter coating, lamé-filled coating, etc., and any of these types of coating can be obtained by using a coating composition containing a polyalkoxysiloxane compound of the present invention.

Resin Composites

The ordinary resin compositions can be used when a polyalkoxysiloxane compound of the present invention is applied to the resin compositions containing fillers such as various types of powder. The fillers usable for these resin compositions include inorganic fillers, for example, carbonaceous materials such as carbon black, graphite, carbon fiber, carbon balloon and powdered charcoal, oxides such as silica, alumina, magnesium oxide, diatomaceous earth, zinc oxide, titanium oxide, calcium oxide, magnesium oxide, iron oxide, tin oxide, antimony oxide and ferrite, hydroxides such as aluminum hydroxide, magnesium hydroxide, calcium hydroxide and basic magnesium carbonate, carbonates such as calcium carbonate, magnesium carbonate, zinc carbonate, barium carbonate, dawsonite and hydrotalcite, sulfates such as calcium sulfate, barium sulfate and gypsum fiber; and silicates such as talc, clay, mica, calcium silicate, montmorillonite, bentonite, activated clay, sepiolite, imogolite, sericite, glass fiber, glass beads and silica-based balloon; and organic fillers, for example, organic polymeric compounds such as polystyrene, polyethylene, polypropylene, nylon, aramide and powdered polyethylene tetrafluoride (commercially available as "Teflon"), woodmeal, starch, pulp and powdered rubber. These fillers may be used either singly or as a mixture of two or more of them.

The shape of the filler may be, for instance, fibrous like glass fiber and carbon fiber, acicular like potassium titanate, slag fiber and whiskers, plate like talc, mica, sericite, BN and MIO, spherical, particulate or amorphous like calcium carbonate, silica, clay and silica-based balloon. These fillers may be either general-purpose fillers which are primarily intended for filling or improving strength, or functional fillers which are principally designed to afford specific properties such as piezoelectric property, electroconductivity and magnetic property to the coatings.

As matrix, various types of resin materials such as, for example, phenols, melamines, unsaturated polyesters, polyimides, epoxy, urethanes, polybutadiene, nylons, polyethylene, polyvinyl chloride, polystyrene, polycarbonates, ABS, chloroprene and polyisoprene can be used.

The composite materials can be produced by the known methods. Typical examples thereof are a method in which the filler powders are first surface treated with a polyalkoxysiloxane compound of the present invention and then blended with the resin material, and a method (so-called internal addition method) in which a polyalkoxysiloxane compound and a filler powder are blended with the resin material.

In case where a polyalkoxysiloxane compound of the present invention is used for the surface treatment of the powder filler, the said compound is added in an amount of 0.1 to 10 parts by weight, preferably 1 to 5 parts by weight based on 100 parts by weight of the filler. Surface treatment can be accomplished by ordinary means, such as using a Henschel mixer or ball mill.

The polyalkoxysiloxane compounds are remarkable for their safety in use because they produce no hydrogen gas in surface treatment by having no Si—H bond.

For the surface treatment of powders by using a polyalkoxysiloxane compound of the present invention, an ordinary wet process or dry process can be used. In case of using a dry process, for instance, it is expedient to use a mixer/stirrer having a drying means, such as Henschel mixer.

Feedstock powders and a predetermined amount of a siloxane compound are supplied to the mixer/stirrer, mixed and stirred at room temperature until the powder surfaces are wetted sufficiently, and then heated to 100 to 150° C. with stirring continued to promote crosslinking reaction of the polyalkoxysiloxane compound while evaporating away the volatiles such as water to provide the surface treated powders. In case where it is difficult to uniformly wet the feedstock powders with a predetermined amount of a siloxane compound, the polyalkoxysiloxane compound may be diluted with water before use. In order to enhance affinity for the matrix, the feedstock powders, after surface treated with a siloxane compound, especially a polyalkoxysiloxane compound of the present invention or a water-diluted solution thereof, may be dried as required and further treated with a coating solution comprising a silicon-containing composition prepared by blending a polyalkoxysiloxane compound of the present invention with an organic compound.

In case where a polyalkoxysiloxane compound of the present invention is added in the course of mixing of the filler such as non-treated powders and a resin by the internal addition method, the said compound is usually added in an amount of 0.1 to 20 parts by weight, preferably 1 to 10 parts by weight based on 100 parts by weight of the whole filler. Mixing can be effected by using an ordinary mixing means.

By using the polyalkoxysiloxane compound of the present invention, it is possible to reduce the viscosity in the mixing operation.

The polyalkoxysiloxane compounds of the present invention, because of their excellent affinity for various types of base, can be used either in a single form or in the form of a coating solution with an organic compound, especially a silane coupling agent, for coating of various types of base. Examples of the bases to which such coatings can be applied include glass, cement, concrete, metals such as iron, copper, nickel, gold, silver, aluminum, rare earth metals and cobalt, carbonaceous materials such as carbon black, graphite, carbon fiber, activated carbon and hollow carbon spheres oxides such as silica, alumina, titanium oxide, beryllium oxide, iron oxide, zinc oxide, magnesium oxide, tin oxide, antimony oxide, barium ferrite and strontium ferrite, hydroxides such as aluminum hydroxide and magnesium hydroxide, carbonates such as calcium carbonate and magnesium carbonate, sulfates such as calcium sulfate, silicates such as talc, clay, mica, calcium silicate, glass, hollow glass spheres and glass fiber, powders of various types of inorganic materials such as calcium titanate, lead titanate zirconate, aluminum nitride, silicon carbide and cadmium sulfide, and organic fillers such as woodmeal, starch, various types of organic pigments, polystyrene and nylons. It is possible to treat various types of powders no matter whether the filler used is a general-purpose filler or a functional filler which is intended to provide specific properties such as electroconductivity, electromagnetic wave shielding property, magnetic property, sound insulation, heat conductivity, flame retardancy, wear resistance, etc. These surface treated powders can be applied not only to the said resin composites but as well to various other types of materials, for example, coatings such as oil paint, synthetic resin coating, water-soluble resin coating, emulsion coating, aggregate-filled emulsion coating, traffic paint, putty and caulk, rubber products such as shoe sole, electric cord, tire, materials for industrial, belt, hose, rubberized fabric, glue, adhesive tape, latex and back-sizing, paper products such as those for coating, those for interior trim and synthetic paper, products of synthetic resins such as PVC, polyolefins, epoxy/phenol resins and unsaturated polyesters, and various industrial products such as electric welding rod, glass articles, acid neutralizing agents, pharmaceuticals, foodstuff, materials for sugar manufacture, dentifrice, cleanser, bunker sand, agricultural chemicals, assorted feeds and building materials. The said powders may also be mixed with fibers or resin materials as filler and molded into FRP (fiber reinforced plastic) products.

For impregnating a porous material such as paper with a polyalkoxysiloxane compound of the present invention or a silicon-containing composition obtained by blending the said compound with an organic compound, the porous material is dipped in a liquid polyalkoxysiloxane compound or a silicon-containing composition and then dried. By carrying out a crosslinking reaction at normal temperature or under heating, it is possible to impart such properties flame retardancy and smoothness to the treated material. In use of a polyalkoxysiloxane compound of the present invention or a silicon-containing composition for adhesion, the said compound or silicon-containing composition is first applied to the adherend surfaces and these surfaces are contact bonded before the said compound or silicon-containing composition is perfectly hardened. A higher surface adhesive strength can be obtained by precoating the adherend surfaces with the said compound or its hydrolyzate solution.

The fourth aspect of the present invention relating to the aqueous emulsion-forming compositions is explained below.

This embodiment of the present invention is based on the finding that the specific composition obtained by blending a polyalkoxysiloxane compound represented by a specific rational formula with a nonionic surfactant shows excellent storage stability in the liquid state even when blended with the existing aqueous coatings, and is also very useful for providing such functions as stain resistance and weather resistance to the coat Component A: Polyalkoxysiloxane Compound The polyalkoxysiloxane compounds used for the aqueous emulsion-forming compositions of the present invention are represented by the rational formula $SiO_a(OR^1)_b(OR^2)_c$ wherein $0.5 \leq a \leq 1.4$. When a<0.5, the said compounds, when blended in an existing water-based coating, coating solution or aqueous resin composition containing fillers such as various types of powder, are sluggish in deriving the said functions of the coat. When a>1.4, the obtained composition becomes highly viscous and tends to gel, resulting in badly reduced storage stability.

The preferred range of a is $0.6 \leq a \leq 1.3$, more preferably $0.7 \leq a \leq 1.2$. When a is in this range, the coating preparation obtained by blending a polyalkoxysiloxane compound of the present invention in an existing water-based coating, etc., is remarkably improved in workability, and is also enhanced in its capability of providing the functions such as stain resistance, weather resistance, scratch resistance, acid resistance, etc., to the obtained coat. Further, good reproducibility of such functions can be obtained.

It is essential for obtaining a coating with excellent stain resistance and raindrop stain resistance that $R^1$ is a methyl group and/or an ethyl group is an essential requisite. When $R^1$ is defined as such, in case where the coating obtained by blending a polyalkolxysiloxane compound of the present invention in an available coating composition is applied outdoors and left exposed to moisture, the compound is readily hydrolyzed with moisture in the air to generate SiOH group, forming a hydrophilic coating film.

When $R^1$ is an alkyl group having a more number of carbon atoms than ethyl groups ($C_2$), hydrolyzability of the compound is reduced to discourage formation of SiOH group on exposure to moisture, resulting in restricted development of the said coat functions (stain resistance and raindrop stain resistance). For these reasons, $R^1$ is most preferably a methyl group.

$R^1$ is a methyl group or an ethyl group, preferably an ethyl group. $R^2$ is an organic group different from $R^1$, for example, at least one of alkyl group, cycloalkyl group, alkoxyalkyl group, aryl group, aralkyl group and alkylpolyoxyalkylenyl group.

It is preferable that $R^2$ be at least one of these groups, because when a coating composition is prepared by blending a compound of the present invention in a water-based coating, etc., compatibility of the compound with the resin moiety and storage stability of the composition are improved.

Typical examples of $R^2$ are listed below.

Alkyl groups: propyl, butyl, pentyl, hexyl, heptyl, 2-ethylhexyl, octyl, decyl, etc. These groups may be linear or branched.

Cycloalkyl groups: cyclohexyl, cyclobutyl, cyclopentyl, etc.

Alkoxyalkyl groups: methoxyethyl, ethoxyethyl, butoxyethyl, etc.

Aryl groups: phenyl, tolyl, xylyl, etc.

Aralkyl groups: benzyl, phenetyl, etc.

Alkylpolyoxyalkylenyl groups: $CH_3-(OCH_2CH_2)_n-$, $C_2H_5-(OCH_2CH_2)_n-$, $CH_3-(OCH_2CHCH_3)_n-$, $C_2H_5-(OCH_2CHCH_3)_n-$, etc.

$R^2$ is selected mostly in view of compatibility with the resin moiety in the coating composition and development of the functions such as stain resistance, weather resistance, acid resistance, etc., of the obtained coat. Especially in the case of the said polyalkoxysiloxane compounds, $R^2$ can be selected from a wide range, so that good compatibility with a wide variety of organic compounds to be used as resin moiety can be obtained. It is particularly preferable that $R^2$ is an alkyl group having a more number of carbon atoms that propyl group ($C_3$). The more the number of carbon atoms is, the higher is the organic nature of the compound, and a higher compatibility with the substances of high organic nature such as coating resins can be obtained. Also, in the case of alkoxyalkyl groups, hydrolysis/condensation reactivity is reduced to improve storage stability when the compound is blended in a coating containing an organic resin or a pigment. It is to be noted, however, that if the carbon number of the alkyl group is more than necessary, although compatibility of the compound and storage stability of the composition are improved, the functions such as stain resistance, weather resistance and scratch resistance of the obtained coat are deteriorated. Thus, $R^2$ is most preferably a $C_4$–$C_8$ alkyl group.

$R^1$ and $R^2$ can be properly selected according to the purpose of use of the polyalkoxysiloxane compound used in the aqueous emulsion-forming compositions of the present invention. For instance, in case where a polyalkoxysiloxane compound of the present invention is blended in a water-based coating as described below, $R^1$ and $R^2$ are selected in consideration of compatibility of the compound with the resin moiety in the coating composition and the coat functions such as storage stability and stain resistance.

The molar ratio of $R^2$ to $R^1$ and $R^2$, indicated by c/(b+c), is preferably in the range of 0.05 to 0.5, more preferably 0.1 to 0.3. When a polyalkoxysiloxane compound with c/(b+c) <0.05 is blended in an existing water-based coating, coating solution or aqueous resin composition containing a filler such as various types of powder, the blend is low in storage stability and tends to give rise to such problems as increase of viscosity and gelation. On the other hand, when a polyalkoxysiloxane compound with c/(b+c)>0.5 is blended an existing water-based coating, etc., the coat formed with the blend may be unsatisfactory in development of its functions such as stain resistance, weather resistance, scratch resistance and acid resistance.

Especially when a polyalkoxysiloxane compound of the present invention is blended in a water-based coating, etc., in such a manner that it satisfies both of the conditions of $0.5 \leq a \leq 1.4$ and c/(b+c)=0.05 to 0.5 (2a+b+c=4), the blend shows excellent storage stability and also the coat formed therewith is most excellent in development of such functions as stain resistance, scratch resistance, acid resistance, etc.

The factors a, b and c can be determined in the following way.

(1) —$OR^1$ and —$OR^2$ attached to the Si atom are determined respectively by $^1$H-NMR analysis using tetrabromoethane as internal standard and expressed as b' (mol/kg) and c' (mol/kg), respectively.

(2) The silica concentration determined by silica analysis (gravimetric method: hydrolytic calcination) is expressed as a' (wt %).

(3) Calculation of a, b and c
b=(b'×60.1)/(a'×10)
c=(c'×60.1)/(a'×10)
From 2a+b+c=4, a=(4−(b+c))/2.

Note: a may be determined from Si-NMR analysis.

The weight-average molecular weight of the polyalkoxysiloxane compounds used in the aqueous emulsion-forming compositions of the present invention is usually in the range of 260 to 5,000, preferably 400 to 4,000, more preferably 500 to 3,000. When the weight-average molecular weight is less than 260, the tetralkoxysilane (monomer) content becomes high, and especially in the case of tetramethoxysilane, care must be taken in handling of the compound because of its high toxicity, and sufficient equipment to ensure safety of the worker is indispensable. On the other hand, when the weight-average molecular weight exceeds 5,000, the compound is high in viscosity, tends to gel and greatly deteriorates in storage stability. The polyalkoxysiloxane compounds used in the present invention, with their weight-average molecular weight falling within the range of 260 to 5,000, is a liquid substance having a viscosity of 3 to 500 cp at 25° C. and good storage stability, so that the said substance can be easy to handle and easily blended in coatings.

The weight-average molecular weight of the polyalkolxysiloxane compounds used in the present invention was determined based on the GPC measurements of polymethoxysiloxane with polypropylene glycol as standard.

Of the known polymethoxysiloxane compounds such as MS51 and MR56, those having a molecular weight of not less than 1,000 are increased in molecular weight through hydrolysis/condensation of tetramethoxysilane, so that it is necessary to add a large amount of water. Addition of a large amount of water leads to high viscosity and gelling tendency of the obtained polymethoxysiloxane compound, so that a stable liquid compound can hardly be obtained. The polyalkoxysiloxane compounds used in the present invention are quite epochal in that increase of their molecular weight was made possible as described above. These compounds, as a silica-rich substance with good storage stability, can be blended in a water-based coating, etc., for forming an organic/inorganic composite coat, and in this respect, they provides a breakthrough for developing the particular functions such as stain resistance, weather resistance, scratch resistance, acid resistance, etc., of the coats.

The polyalkoxysiloxane compounds used in the present invention can be obtained by conducting ester exchange of part of the methoxyl group and/or ethoxyl group of a partial hydrolysis/condensation product of, for example, tetramethoxysilane and/or tetraethoxysilane to a prescribed degree by using an alcohol having at least one of alkyl group other than methoxyl and ethoxyl, cycloalkyl group, alkoxyalkyl group, aryl group, aralkyl group and alkylpolyoxyalkylenyl group. Of course, this process is not the only method available for the preparation of the said compounds.

It is preferable that the tetramethoxysilane content in the polyalkoxysiloxane compounds used in the present invention is defined to be not more than 1% by weight, as this can avoid the problem of toxicity and facilitate safe working. In case where the tetramethoxysilane content exceeds 1% by weight, it is advised to take appropriate measures such as removal of the superfluous portion by distillation.

Component (B): Surfactant

This embodiment of the invention features incorporation of a nonionic surfactant in the said polyalkoxysiloxane compounds for the preparation of aqueous emulsion forming compositions. Examples of the nonionic surfactants usable in this embodiment include polyoxyethylene alkyl ether, polyoxyethylene alkylaryl ether, polyoxyethylene fatty acid esters, polyoxyethylene sorbitan fatty acid esters, polyoxyethylene sorbitol fatty acid esters, sorbitan fatty acid esters, glycerin fatty acid esters, and polyoxyethylene alkylamines. These surfactants may be used singly or in admixture. It is possible to use other types of nonionic surfactant having good compatibility with the polyalkoxysiloxane compounds and capable of providing an aqueous emulsion-forming composition. An appropriate nonionic surfactant is selected in view of retention of storage stability, appearance of the coat formed with an aqueous coating containing the said composition, and capability to develop the specified functions such as stain resistance, weather resistance, acid resistance, water resistance, solvent resistance, etc., of the coat. For forming a stable emulsion by blending a nonionic surfactant with a polyalkoxysiloxane compound to prepare an aqueous emulsion-forming composition and adding it to an existing water-based coating, it is preferable to use a nonionic surfactant whose HLB is not less than 8.0, more preferably not less than 9.0. When the HLB value of the nonionic surfactant used is less than 8.0, it is difficult to form a stable emulsion as storage stability of the water-based coating having an aqueous emulsion forming composition incorporated therein lowers. Also, appearance of the coat formed therewith and film properties such as stain resistance, weather resistance, acid resistance, water resistance, solvent resistance, etc., are deteriorated.

Aqueous Emulsion-Forming Composition

The "aqueous emulsion-forming composition" in accordance with the present invention is a mixture of a polyalkoxysiloxane compound represented by the specific rational formula shown above and a nonionic surfactant such as mentioned above. This composition is added to an existing water-based coating, etc., for providing the specific functions such as stain resistance, weather resistance, acid resistance, water resistance, solvent resistance, etc., to the coat without-impairing storage stability of the coating.

The content of the nonionic surfactant is preferably 1 to 50 parts by weight, more preferably 5 to 30 parts by weight based on. 100 parts by weight of the polyalkoxysiloxane compound. When the surfactant content is less than 1 part by weight, it is difficult to form a stable emulsion with a water-based coating to which an aqueous emulsion-forming composition prepared by blending a surfactant with a polyalkoxysiloxane compound has been added. When the surfactant content exceeds 50 parts by weight, the coat formed with such a coating is deteriorated in its properties such as weather resistance, scratch resistance, water resistance, etc., due to the residual surfactant in the coat, so that addition of the surfactant in excess of 50 parts by weight is prohibitive.

Mixing of a polyalkoxysiloxane compound and a surfactant can be effected by a known method using a stirrer or other preferable means at normal (room) temperature. Any mixing method can be used as far as it is capable of effecting uniform mixing.

Uses

The aqueous emulsion-forming composition of the present invention described above, when added to an existing water-based coating, coating solution or aqueous resin composition containing a filler such as various types of powder, is capable of forming a stable emulsion with a particle size ranging from 0.1 to 20 microns, and is preferred for use as a coating material or composite material.

As for the content of the composition in the coating, in case where it is used for improving adhesion to the base to be coated or improving stain resistance, weather resistance and such properties of the coat surface, the said composition is usually added in an amount not more than 10 parts by weight, preferably 1 to 7 parts by weight, calculated as polyalkoxysiloxane compound based on 100 parts by weight of nonvolatiles of the water-based coating or coating solution. It is thus possible to obtain the desired effect by adding only a small amount of the said composition.

Of course, even when the aqueous emulsion-forming composition of the present invention is added to a high concentration exceeding 10 parts by weight, calculated as polyalkoxysiloxane compound based on 100 parts by weight of nonvolatiles of the water-based coating or coating solution, the composition shows excellent compatibility in the liquid form and is capable of remarkably improving the coat properties, especially heat resistance, scratch resistance and chemical resistance.

The amount of the composition to be added in the above case is usually not less than 10 parts by weight, preferably 10 to 70 parts by weight, calculated as polyalkoxysiloxane compound based on 100 parts by weight of nonvolatiles of the water-based coating or coating solution.

For improving stain resistance of the coat surface, it is preferable to use a polyalkoxysiloxane compound having a weight-average molecular weight of not less than 500.

Water-Based Coatings

In use of the aqueous emulsion-forming composition of the present invention, it is added to water-dispersed resin coatings or aqueous emulsion resin coatings. In this case, it is possible to use various types of commercially available water-based coatings. The coats formed with such coatings are especially excellent in stain resistance, weather resistance, scratch resistance, water resistance and solvent resistance.

For instance, the aqueous emulsion-forming composition of the present invention may be added to such aqueous emulsion resin coatings as vinyl acetate resin coatings, vinyl acetate-acrylic resin coatings, vinyl acetate-branched higher fatty acid vinyl ester resin coatings, ethylene-vinyl acetate resin coatings, acrylic resin coatings, acrylic styrene resin coatings, acrylic urethane resin coatings, acrylic silicon resin coatings, polyester resin coatings and fluorine resin coatings.

The amount of the aqueous emulsion forming composition to be added is preferably 1 to 40 parts by weight, calculated as polyalkoxysiloxane compound based on 100 parts by weight of the resin nonvolatiles. When the amount of the composition added is less than 1 part by weight, it is hard to develop such functions as stain resistance and scratch resistance of the coat. When the amount of the composition exceeds 40 parts by weight, the produced coatings lack storage stability and the coat formed therewith is liable to crack.

The preferred range of amount of the said composition to be added is 2 to 30 parts by weight, calculated as polyalkoxysiloxane compound based on 100 parts by weight of the resin nonvolatiles. An amount of 2 to 10 parts by weight is sufficient for providing stain resistance in particular to the coat.

The pigments that can be blended in the coatings include inorganic and organic pigments. Examples of the inorganic pigments include lead compounds such as white lead (basic lead carbonate), zinc compounds such as zinc oxide and lithopone, titanium compounds such as titanium oxide, cobalt compounds such as aureolin, cobalt green, cerulean blue 2, cobalt blue and cobalt violet, iron compounds such as iron oxide, chromium compounds such as chromium oxide, lead chromate and barium chromate, carbon black, etc. Examples of the organic pigments include water-insoluble colored compounds such phthalocyanine type, dioxadine type, anthraquinone type and quinopthalone type, and their metal-containing compounds. Needless to say, it is possible to use other types of compounds if they are capable of use as a pigment for coatings. These pigments may be used either singly or as a mixture of two or more of them.

In preparation of a pigmented coating using an aqueous emulsion-forming composition of the present invention, the said composition may be blended in a coating in which a pigment has already been dispersed, or the pigment may be added after blending the said composition. Of course, the said composition can be used for the coatings containing various types of dyes. The coatings can be prepared according to a known process as far as an aqueous emulsion-forming composition of the present invention is used. Also, when an aqueous emulsion-forming composition of the present invention is mixed in an existing water-based coating, coating solution or aqueous resin composition containing fillers such as various types of powder, a small amount of an anionic surfactant and/or a cationic surfactant or an ampholytic surfactant may be added for the purpose of improving storage stability of the obtained emulsion or expediting development of the specific functions of the coat. It is to be noted that since these surfactants usually contain water, if they are added in the course of preparation of the aqueous emulsion-forming composition of the present invention, the polyalkoxysiloxane compound may undergo hydrolysis/condensation to cause a change of quality with time. Preferably, therefore, these surfactants are previously added to an existing water-based coating, coating solution or aqueous resin composition containing fillers such as various types of powder, or added synchronously with addition of the aqueous emulsion-forming composition of the present invention. The anionic surfactants usable for the above purpose in the present invention include, for example, fatty acid salts, alkylsulfuric ester salts, alkylarylsulfonates, alkylnaphthalenesulfonates, alkylsulfosuccinates, alkyldiphenyl ether disulfonate, alkyl phosphate, polyoxyethylenealkylsulfuric ester salts, alkylallylsulfuric ester salts, naphthalenesulfonic acid-formalin condensate and its salts, polyoxyethylenealkylphosporic esters and their salts. These anionic surfactants may be used in combination. Other types of anionic surfactants are also usable.

The cationic surfactants usable in the present invention include, but are not limited to, alkylamine salts, quaternary ammonium salts, alkylpyridinium salts, alkylimidazolium salts and the like, which may be used either singly or in combination. The ampholytic surfactants include, but are not limited to, alkylbetaine, alkylamine oxide and the like, which may be used singly or in combination.

The amount of the surfactant to be used is preferably not more than the amount of the said nonionic surfactant, more preferably not more than ½ thereof.

Outer Wall Coatings and Sizing Top Coatings

The aqueous emulsion-forming composition of the present invention can be blended with various types of aqueous resin materials to prepare the coatings for application to various sorts of base. Especially, by applying a conventional organic resin type coating to a sizing material used as a construction material for outer walls and further applying thereon a water-based coating containing the aqueous emulsion-forming composition of the present invention as a topcoat, it is possible to afford stain resistance, weather resistance, scratch resistance, water resistance, solvent resistance, etc., as well as good visual appearance to the outer wall material. Further, since the rain streak stain preventive effect of polyalkoxysiloxane is produced, the labor required for maintenance is greatly lessened and a very excellent construction material is provided.

The topcoat formed with the said water-based coating containing the aqueous emulsion-forming composition of the present invention also shows high adhesive force when applied to a sizing material. The sizing materials to which the said coating can be applied include ceramic sizing materials and metallic sizing materials. The said topcoating can also be applied to external tiling. Examples of the ceramic sizing materials include, but are not limited to, magnesium carbonate plates, hard excelsior plates, wood fiber-filled cement calciumsilicate molded plates, pulp-filled cement extrusion molded plates and the like. The topcoating according to the present invention can be applied to any of these bases without restrictions.

Various types of coating such as inorganic coating, inorganics-containing coating, fluorine coating, shade coating, sand coating, aggregate-filled coating, sputter coating, lamé-filled coating, etc., can be applied to external wall materials. The aqueous emulsion-forming composition of the present invention may be contained in the coating materials used for such coating.

The fifth aspect of the present invention relating to other aqueous emulsion-forming compositions will be described below.

This embodiment of the invention is based on the finding that a specific coating composition obtained by blending a polyalkoxysiloxane compound represented by a specific rational formula, an organic solvent having a solubility parameter (SP) of not more than 9.5 and a nonionic surfactant shows high storage stability in the liquid state even when blended in the existing water-based coatings, and is also capable of developing such functions as stain resistance and weather resistance of the coat to an advanced extent.

Component (A): Polyalkoxysiloxane Compound

The polyalkoxysiloxane compounds used for the aqueous emulsion-forming compositions of the present invention are represented by the rational formula $SiO_a(OR^1)_b(OR^2)_c$ wherein $0.5 \leq a \leq 1.4$. When $a<0.5$, it is hardly possible to realize the aimed development of such functions as stain resistance and weather resistance of the coat formed with a coating obtained by blending the said compound in an existing water-based coating, coasting solution or aqueous resin composition containing fillers such as various types of powder. On the other hand, when $a>1.4$, the obtained polyalkoxysiloxane compound is high in viscosity and tends to gel, resulting in excessive deterioration of storage stability. The preferred range of a is $0.6 \leq a \leq 1.3$, more preferably $0.7 \leq a \leq 1.2$. When a is in this range, the coatings obtained by blending a polyalkoxysiloxane compound of the present invention in an existing water-based coating, etc., are markedly improved in workability and show the enhanced effect of providing such functions as stain resistance, weather resistance, scratch resistance, acid resistance, etc., to the obtained coat. Also, good reproducibility of these functions can be obtained.

$R^1$ is a methyl group or an ethyl group, preferably a methyl group. $R^2$ is an organic group different from $R^1$, for example, at least one of alkyl group, cycloalkyl group, alkoxyalkyl group, aryl group, aralkyl group and alkylpolyoxyalkylenyl group.

Component (B): Organic Solvent

The instant embodiment of the present invention features blending of an organic solvent having SP of not more than 9.5 as component (B) with a polyalkoxysiloxane compound used as component (A) described above.

The polyalkoxysiloxane compounds have the nature that they tend to undergo hydrolysis/condensation reaction in the presence of water, consequently elevate in molecular weight and finally gel. The present inventors have conducted earnest studies on application to water-based coatings of the polyalkoxysiloxane compounds which contributed to the development of such functions as stain resistance, weather resistance and water resistance to the obtained coat. As a result, it was found that by dissolving a polyalkoxysiloxane compound represented by a specific rational formula shown above with a hydrophobic organic solvent with SP of not more than 9.5, storage stability of the compound is enhanced even in the presence of water and the compound is made usable in a state where gelation is suppressed from taking place. This may be accounted for by the fact that as a polyalkoxysiloxane compound is dissolved in a hydrophobic organic solvent, the said solvent exists at the emulsion interface when the compound is emulsified, resulting in a reduced frequency of contact between the polyalkoxysiloxane compound and water.

SP of the hydrophobic-organic solvent used in this embodiment is preferably not more than 9.5, more preferably not more than 9.0. When SP>9.5, the organic solvent is elevated in hydrophilicity, and even when the solution of a polyalkoxysiloxane compound dissolved in the said solvent is added to a water-based coating along with a surfactant (to be described later) and emulsified, no further improvement of storage stability can be expected.

The hydrophobic organic solvents with SP of not more than 9.5 usable in the present invention include aliphatic hydrocarbons, aromatic hydrocarbons, halogenated hydrocarbons, ethers, ketones, aldehydes, esters, glycol derivatives and nitrogen compounds. These solvents may be used singly or in combination.

Examples of the hydrocarbons are benzene, toluene, xylene, styrene, ethylbenzene, pentane, hexane, heptane, octane, cyclohexane, methylcyclohexane, ethylcyclohexane, mineral spirit, Solvesso 100, Solvesso 150, Solvesso 200, Freon 113, Freon 112, Freon 21, 2,2-dichloropropane, 1,2-dichloropropane, chloroform, propyl chloride, trichloroethylene, tetrachloroethylene and chlorobenzene.

Examples of the ethers are diamyl ether, diethyl ether, ethylisobutyl ether, dibutyl ether, dipropyl ether and dimethyl ether.

Examples of the ketones are methyl ethyl ketone, diethyl ketone, methyl butyl ketone, methyl isobutyl ketone, methyl propyl ketone, methyl isopropyl ketone, methyl amyl ketone, methyl isoamyl ketone, methyl hexyl ketone, ethyl amyl ketone, diisopropyl ketone, methyl nonyl ketone, diisobutyl ketone and dibutyl ketone.

Examples of the aldehydes are butylaldehyde and benzaldehyde. Examples of the esters are ethyl acetate, n-propyl acetate, isopropyl acetate, n-butyl acetate, isobutyl acetate, n-amyl acetate and isoamyl acetate. Examples of the glycol derivatives are ethylene glycol monomethyl ether acetate, ethylene glycol monoethyl ether acetate, diethylene glycol monoethyl ether acetate and diethylene glycol monomethyl ether acetate.

Examples of the nitrogen compounds are benzonitrile and capronitrile.

The above-mentioned are merely examples of the hydrophobic organic solvents usable in the present invention. A preferable solvent is selected from these and other types of hydrophobic organic solvents whose SP value is not more than 9.5 and which have good compatibility with the polyalkoxysiloxane compounds used in the present invention and are also conducive to maintenance of storage stability, provision of good appearance of the coat and development of its functions such as stain resistance, weather resistance, acid resistance, water resistance and solvent resistance when they are blended with a surfactant (to be described later) to form an aqueous emulsion-forming composition and added to an existing water-based coating.

As for the hydrophobic organic solvent/polyalkoxysiloxane compound mixing ratio, the hydrophobic organic solvent is blended in a ratio of 20 to 500 parts by weight, preferably 50 to 200 parts by weight, based on 100 parts by weight of the polyalkoxysiloxane compound, and the polyalkoxysiloxane compound is dissolved in the hydrophobic organic solvent to form a homogeneous solution. When the ratio of the hydrophobic organic solvent is less than 20 parts by weight, it may become difficult to maintain storage stability of the coating obtained by mixing the said solvent with a surfactant to form an aqueous emulsion-forming composition and adding it to an existing water-based coating. When the ratio of the hydrophobic organic solvent exceeds 300 parts by weight, the content of the polyalkoxysiloxane compound is reduced and accordingly the amount of the aqueous emulsion-forming composition to be added to an existing water-based coating for developing the coat functions such as stain resistance, weather resistance and water resistance is increased, which gives rise to the problems of increase of the organic solvent content in the coating and rise of viscosity of the coating.

Component (C): Surfactant

This embodiment of the invention features blending of a polyalkoxysiloxane compound as component (A), an organic solvent with SP of not more than 9.5 as component (B) and a nonionic surfactant as component (C) to form an aqueous emulsion-forming composition.

Examples of the nonionic surfactants usable as component (C) include, but are not limited to, polyoxyethylene alkyl ether, polyoxyethylene alkylaryl ether, polyoxyethylene fatty acid esters, polyoxyethylene sorbitan fatty acid esters, polyoxyethylene sorbitol fatty acid esters, sorbitan fatty acid esters, glycerin fatty acid esters and polyoxyethylene alkylamine. These surfactants may be used singly or in combination of two or more of them. A preferable surfactant is selected in view of compatibility with the polyalkoxysiloxane compound and capability of the said aqueous emulsion-forming composition in maintaining storage stability and providing good appearance as well as such functions as stain resistance, weather resistance, acid resistance, water resistance and solvent resistance to the coat.

It is especially preferable that the nonionic surfactant used in this embodiment has a HLB value of not less than 8.0, more preferably not less than 9.0, for forming a stable emulsion by adding the said aqueous emulsion-forming composition to an existing water-based coating. When the HLB value of the nonionic surfactant used is less than 8.0, it is difficult to form a stable emulsion, and storage stability of the water-based coating to which the aqueous emulsion-forming composition has been added is lowered. Also, the coat formed with such a coating is bad in appearance and in properties such as stain resistance, weather resistance, acid resistance, water resistance, solvent resistance, etc.

The content of the nonionic surfactant is preferably 1 to 50 parts by weight, more preferably 5 to 30 parts by weight based on 100 parts by weight of the mixture of the polyalkoxysiloxane compound used as component (A) and the organic solvent with SP<9.5 used as component (B). When the content of the nonionic surfactant is less than 1 part by weight, it is hard to form a stable emulsion by adding the said aqueous emulsion-forming composition to an existing water-based coating.

When the nonionic surfactant content exceeds 50 parts by weight, the coat formed with a water-based coating using the said aqueous emulsion-forming composition is poor in weather resistance, scratch resistance, water resistance, etc., due to the residual surfactant in the coat, so that excess addition of the surfactant should be avoided.

Aqueous Emulsion-Forming Composition

The "aqueous emulsion-forming composition" in this embodiment of the invention is a mixture of a polyalkoxysiloxane compound (component (A)) represented by a specific rational formula, an organic solvent (component (B)) with SP<9.5 and a nonionic surfactant (component (C)). This composition is added to an available water-based coating, which makes it possible to form a coat having such functions as stain resistance, weather resistance, acid resistance, water resistance and solvent resistance while maintaining storage stability of the coating.

The aqueous emulsion-forming composition in this embodiment of the invention can be prepared by mixing the three components (A), (B) and (C) for several minutes to several hours by a conventional method using a mixer or a stirrer. The preparation method is not defined as far as it is capable of uniformly dissolving the components. Heating can be applied for facilitating dissolving of the components. As for the order of mixing, (A) and (B) may be mixed first, followed by addition of (C), or (A) and (C) or (B) and (C) may be mixed first, followed by addition of (B) or (A). of course, it is possible to mix (A), (B) and (C) all together. The thus obtained aqueous emulsion-forming composition is blended in a water-based coating, coating solution or aqueous resin composition containing fillers such as various types of powder to improve storage stability of the coating in the liquid state while providing excellent functions such as mentioned above to the obtained coat.

BEST MODE FOR CARRYING OUT THE INVENTION

The present invention will hereinafter be described in further detail by showing the examples thereof. In the following description, all "%" is by weight unless otherwise noted.

Example 1

An acid catalyst, 95 g of water and 315 g of methanol were added to 1,000 g of tetramethoxysilane, and the mixture was subjected to hydrolysis/condensation under reflux at about 65° C. Then 120 g of n-butanol was added and the mixture was heated gradually to carry out ester exchange reaction and removal of residual alcohol while evaporating away methanol to obtain a siloxane compound A.

Example 2

The same procedure as defined in Example 1 was conducted except that n-butanol was added in an amount of 360 g to obtain a siloxane compound B.

Example 3

The same procedure as defined in Example 1 was conducted except that n-butanol was added in an amount of 600 g to obtain a siloxane compound C.

Example 4

An acid catalyst, 117 g of water and 315 g of methanol were added to 1,000 g of tetramethoxysilane and the mixture was subjected to hydrolysis/condensation under reflux at about 65° C. Thereafter the procedure of Example 1 was repeated except for addition of 149 g of n-butanol to obtain a siloxane compound D.

Example 5

An acid catalyst, 128 g of water and 320 g of methanol were added to 1,015 g of tetramethoxysilane and the mixture was subjected to hydrolysis/condensation under reflux at about 65° C. Thereafter the procedure of Example 1 was repeated except for addition of 137 g of n-butanol to obtain a siloxane compound E.

Example 6

An acid catalyst, 64 g of water and 157 g of methanol were added to 497 g of tetramethoxysilane and the mixture was subjected to hydrolysis/condensation under reflux at about 65° C. Thereafter the procedure of Example 1 was repeated except for addition of 132 g of n-butanol to obtain a siloxane compound F.

Example 7

An acid catalyst, 135 g of water and 315 g of methanol were added to 1,000 g of tetramethoxysilane, and the mixture was subjected to hydrolysis/condensation under reflux at about 65° C. Thereafter the procedure of Example 1 was repeated except for addition of 128 g of n-butanol to obtain a siloxane compound G.

Example 8

An acid catalyst, 135 g of water and 315 g of methanol were added to 1,000 g of tetramethoxysilane, and the mixture was subjected to hydrolysis/condensation under reflux at about 65° C. Thereafter the procedure of Example 1 was repeated except for addition of 251 g of n-butanol to obtain a siloxane compound H.

Example 9

An acid catalyst, 73 g of water and 156 g of methanol were added to 495 g of tetramethoxysilane, and the mixture was subjected to hydrolysis/condensation under reflux at about 65° C. Thereafter the procedure of Example 1 was repeated except for addition of 124 g of n-butanol to obtain a siloxane compound I.

Example 10

An acid catalyst, 30.5 g of water and 73.9 g of methanol were added to 234 g of tetramethoxysilane and 61.5 g of n-butanol, and the mixture was subjected to hydrolysis/condensation and ester exchange reaction under reflux at about 65° C. The reaction mixture was then heated gradually to remove residual alcohol while evaporating away methanol to obtain a siloxane compound J.

Example 11

An acid catalyst, 10.4 g of water and 21.3 g of methanol were added to 100 g of tetraalkoxysilane represented by the formula $Si(OCH_4)_{3.08}(OC_4H_9)_{0.92}$, and the mixture was subjected to hydrolysis/condensation under reflux at about 65° C. Then the mixture was heated gradually to remove residual alcohol while evaporating away methanol to obtain a siloxane compound K.

Comparative Example 1

An acid catalyst, 90 g of water and 315 g of methanol were added to 1,000 g of tetramethoxysilane, and the mixture was subjected to hydrolysis/condensation under reflux at about 65° C. Then the mixture was heated gradually to remove residual methanol by evaporation to obtain a siloxane compound

Comparative Example 2

The same procedure as defined in Comparative Example 1 was conducted except that an acid catalyst, 162 g of water and 418 g of methanol were added to 1,323 g of tetramethoxysilane to obtain a siloxane compound M.

Comparative Example 3

The same procedure as defined in Comparative Example 1 was conducted except that an acid catalyst, 172 g of water and 418 g of methanol were added to 1,324 g of tetramethoxysilane to obtain a siloxane compound N.

The rational formulae and molecular weights of the siloxane compounds A to N obtained in Examples 1 to 11 and Comparative Examples 1 to 3 are shown in Table 1, and their property values are shown in Table 2.

TABLE 1

| Siloxane compound | Rational formula | z/(y + z) | Weight-average molecular weight |
|---|---|---|---|
| A | $SiO_{0.82}(OCH_3)_{2.18}(OC_4H_9)_{0.19}$ | 0.08 | 570 |
| B | $SiO_{0.81}(OCH_3)_{1.75}(OC_4H_9)_{0.64}$ | 0.27 | 530 |
| C | $SiO_{0.78}(OCH_3)_{1.46}(OC_4H_9)_{0.98}$ | 0.40 | 543 |

TABLE 1-continued

| Siloxane compound | Rational formula | z/(y + z) | Weight-average molecular weight |
|---|---|---|---|
| D | SiO$_{1.03}$(OCH$_3$)$_{1.67}$(OC$_4$H$_9$)$_{0.27}$ | 0.14 | 900 |
| E | SiO$_{1.06}$(OCH$_3$)$_{1.62}$(OC$_4$H$_9$)$_{0.25}$ | 0.13 | 1356 |
| F | SiO$_{1.07}$(OCH$_3$)$_{1.37}$(OC$_4$H$_9$)$_{0.50}$ | 0.27 | 1378 |
| G | SiO$_{1.13}$(OCH$_3$)$_{1.52}$(OC$_4$H$_9$)$_{0.22}$ | 0.12 | 1787 |
| H | SiO$_{1.14}$(OCH$_3$)$_{1.28}$(OC$_4$H$_9$)$_{0.44}$ | 0.26 | 1795 |
| I | SiO$_{1.21}$(OCH$_3$)$_{1.12}$(OC$_4$H$_9$)$_{0.47}$ | 0.30 | 3275 |
| J | SiO$_{1.06}$(OCH$_3$)$_{1.38}$(OC$_4$H$_9$)$_{0.50}$ | 0.27 | 1320 |
| K | SiO$_{1.09}$(OCH$_3$)$_{1.00}$(OC$_4$H$_9$)$_{0.82}$ | 0.45 | 1200 |
| L | SiO$_{0.87}$(OCH$_3$)$_{2.39}$ | 0 | 613 |
| M | SiO$_{1.04}$(OCH$_3$)$_{1.92}$ | 0 | 1256 |
| N | SiO$_{1.06}$(OCH$_3$)$_{1.89}$ | 0 | 1765 |

TABLE 2

| Siloxane compound | Viscosity at 25° C. (cp) | Haze factor A (ml) |
|---|---|---|
| A | 4.7 | — |
| B | 4.2 | — |
| C | 4.2 | — |
| D | 12.8 | 1.9 |
| E | 28.0 | 1.4 |
| F | 23.8 | 0.9 |
| G | 66.0 | 1.1 |
| H | 42.3 | 0.7 |
| I | 199 | 0.4 |
| J | 21.4 | 1.1 |
| K | 18.3 | 0.6 |
| L | 6.2 | 5.3 |
| M | 34.8 | 2.7 |
| N | 76.7 | 2.2 |

Examples 12 to 14 and Comparative Examples 4 to 6

The siloxane compounds A, B, C and L obtained in Examples 1, 2 and 3 and Comparative Example 1, respectively, MKC Silicate BTS (tetrabutoxysilane produced by Mitsubishi Chemical Corporation) and Ethyl Silicate ES40 produced by COLCOAT CO., LTD. were added, each in an amount of 16 parts by weight, to 100 parts by weight (calculated as nonvolatiles) of an acrylic melamine coating (trade name: TOHAACRON H700 produced by TOHPE CO., LTD; nonvolatile content: 45% by weight) which is a pigmented (titanium oxide powder-filled) general-purpose coating, to prepare the coating compositions. 1.5 parts by weight of desalted water and 0.2 part by weight of maleic acid were added to these coating compositions and their storage stability in a sealed state was evaluated by counting the number of days required till the composition gelled in a 50° C. accelerated test. The results are shown in Tables 3 and 4. Each of these coating compositions was applied on a tinplate sheet by an applicator and cured at 170° C. for 20 minutes to form a coat having a dry thickness of about 30 microns. The results of evaluation of storage stability of the coating compositions in the 50° C. accelerated test and pencil hardness of the coats (scratch test) are shown in Tables 3 and 4.

TABLE 3

| Type of siloxane compound | Example 12 A | Example 13 B | Example 14 C |
|---|---|---|---|
| Blend | | | |
| Acrylic melamine resin | 100 p/W | ← | ← |
| Siloxane compound | 16 p/W | ← | ← |
| Storage stability of coating (50° C. accelerated test) | Gelled on 15th day | Gelled on 25th day | Didn't gel for not less than 30 days |
| Coat properties (pencil hardness) | 3H | 2H | H |

TABLE 4

| Type of siloxane compound | Comp. Ex. 4 L | Comp. Ex. 5 ES40 | Comp. Ex. 6 BTS |
|---|---|---|---|
| Blend | | | |
| Acrylic melamine resin | 100 p/w | ← | ← |
| Siloxane compound | 16 p/w | ← | ← |
| Storage stability of coating (50° C. accelerated test) | Gelled on 10th day | Gelled on 20th day | Didn't gel for not less than 30 days |
| Coat properties (pencil hardness) | 2H | F | F |

Examples 15 and 16 and Comparative Examples 7 and 8

The siloxane compounds D, G, L and M obtained in Examples 4 and 7 and Comparative Examples 1 and 2, respectively were added, each in an amount of 6 parts by weight, to 100 parts by weight of a general-purpose aqueous acrylic emulsion resin (trade name: WOLTEX DX/White produced by TOHPE CO., LTD) to prepare the coating compositions. Storage stability in a sealed state of these coating compositions was evaluated by the number of days required until the composition gelled at 25° C. The results are shown in Tables 5 and 6.

TABLE 5

| Type of siloxane compound | Example 15 D | Example 16 G |
|---|---|---|
| Blend | | |
| Aqueous acrylic emulsion resin | 100 p/w | ← |
| Siloxane compound | 6 p/w | ← |
| Storage stability of coating (25° C. accelerated test) | Didn't gel for not less than 21 days | Didn't gel for not less than 21 days |

TABLE 6

| Type of siloxane compound | Comp. Ex. 7 L | Comp. Ex. 8 M |
|---|---|---|
| Blend | | |
| Aqueous acrylic emulsion resin | 100 p/w | ← |
| Siloxane compound | 6 p/W | ← |
| Storage stability of coating (25° C. accelerated test) | Gelled in 2 days | Gelled in 2 days |

Example 17

Each of the coating compositions obtained in Examples 15 and 16 and a coating composition comprising an aqueous acrylic emulsion resin alone with no siloxane compound added was applied on a tinplate sheet by an applicator and left at room temperature to form a coat having a dry thickness of about 30 microns. The obtained coats were subjected to a one-month outdoor exposure test (conducted in Tama-ku, Kawasaki-shi, Kanagawa-ken, Japan, from Apr. 15 through May 15, 1997).

After the exposure test, the coats formed with the siloxane compound-containing coating compositions of Examples 15 and 16 obviously had less stains such as rain streaks and better surface appearance than the coat formed with the coating composition containing no siloxane compound.

Preparation of Aqueous Emulsion-Forming Compositions

Example 18

The siloxane compounds H, B, N and L obtained in Examples 2 and 8 and Comparative Examples 1 and 3, respectively, and a nonionic surfactant (polyoxyethylene nonylphenyl ether type; HLB=12) were mixed at room temperature to prepare the aqueous emulsion-forming compositions A to D. The mixing ratios of the components and appearance of the liquid are shown in Table 7.

TABLE 7

| Aqueous emulsion-forming composition | Mixing ratio (parts by weight) | | Liquid appearance |
|---|---|---|---|
| | Siloxane compound | Surfactant | |
| A | H 100 | 15 | Homogeneous and transparent |
| B | B 100 | 15 | Homogeneous and transparent |
| C | N 100 | 15 | Homogeneous and transparent |
| D | L 100 | 15 | Homogeneous and transparent |

Confirmation of Emulsion Particle Size of the Aqueous Emulsion-Forming Compositions Example 19

Figure 1:
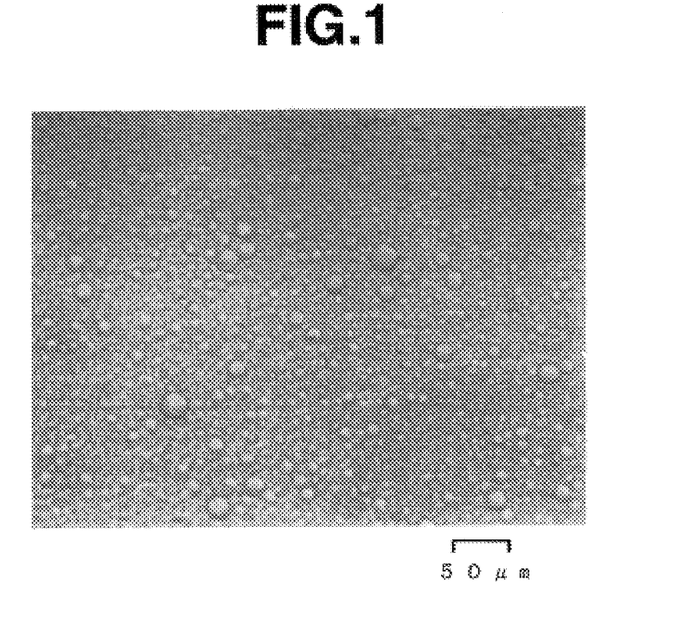
FIG. 1 is a microphotograph of the emulsion obtained in Example 19.

20 parts by weight of the aqueous emulsion-forming composition A of Example 18 and 100 parts by weight of water were supplied into a 200-ml capped glass bottle and shaken for 15 minutes by a shaker to prepare an emulsion. Observation of the state of the emulsion by a transmission differential interference microscope confirmed that the emulsion was composed of the spherical particles of not more than 20 microns. A microphotograph of this emulsion is shown in FIG. 1.

Test of Addition to Existing Water-Based Coatings

Examples 20 to 28 and Comparative Examples 9 to 15

The aqueous emulsion-forming compositions A to D prepared in Example 19 or the siloxane compounds H, B, N and L were blended in the existing water-based coatings and shaken for 15 minutes by a shaker to prepare the coating compositions. The respective blend compositions and the results of the storage stability test on the obtained coating compositions are shown in Tables 8 and 9. The existing water-based coatings used in the test were:

New Glostar (trade name, produced by Kansai Paint Co. Ltd.): a reaction-curing acrylic resin coating, nonvolatiles=52 wt %

Ales Aqua Gloss (trade name, produced by Kansai Paint Co., Ltd.): a reaction-curing urethane resin coating, nonvolatiles=58 wt %

Ales Aquarethane (trade name, produced by Kansai Paint Co., Ltd.): nonvolatiles=56 wt %

TABLE 8

| Examples (Coating composition) | Blend composition (parts by weight) | | Siloxane compound/ non-volatiles of the coating | Storage stability (left at room temperature for 2 months) |
|---|---|---|---|---|
| | Aqueous emulsion-forming compositions | Existing water-based coatings | | |
| Example 20 | A 4.0 | New Glostar 100 | 6.7/100 | Good |
| Example 21 | A 17.3 | New Glostar 100 | 28.9/100 | Thickened |
| Comp. Example 9 | — | New Glostar 100 | — | good |
| Example 22 | Siloxane compound H 3.5 | New Glostar 100 | 6.7/100 | Gelled in 5 days |
| Example 23 | A 4.0 | Aqua Gloss 100 | 6.0/100 | good |
| Example 24 | A 17.2 | Aqua Gloss 100 | 25.8/100 | Gelled in 8 days |
| Comp. Example 10 | — | Aqua Gloss 100 | — | good |
| Example 251 | Siloxane compound H 3.5 | Aqua Gloss 100 | 6.0/100 | Gelled in one days |

TABLE 9

| Examples (Coating composition) | Blend composition (parts by weight) | | Siloxane compound/ non-volatiles of the coating | Storage stability (left at room temperature for 2 months) |
|---|---|---|---|---|
| | Aqueous emulsion-forming compositions | Existing water-based coatings | | |
| Example 26 | B 4.0 | Aqua-rethane 100 | 6.2/100 | Good |
| Example 27 | B 17.2 | Aqua-rethane 100 | 26.8/100 | slightly thickened |
| Comp. Example 11 | — | Aqua-rethane 100 | — | good |
| Example 28 | Siloxane compound B 3.5 | Aqua-rethane 100 | 6.2/100 | good |
| Comp. Example 12 | D 4.0 | Aqua-rethane 100 | 6.2/100 | Gelled in one day |
| Comp. Example 13 | Siloxane compound L 3.5 | Aqua-rethane 100 | 6.2/100 | Gelled in several hours (uncoatable) |
| Comp. Example 14 | C 4.0 | Aqua-rethane 100 | 6.2/100 | good |
| Comp. Example 15 | Siloxane compound N 3.5 | Aqua-rethane 100 | 6.2/100 | Gelled in several hours (uncoatable) |

Evaluation of Coats

These coating compositions were applied on a SUS 304 plate by an applicator and hardened, and the properties of the obtained coats (40 to 60μ thick) were evaluated. Specifically, the angle of static contact of these coats with water and resistance to carbon staining were determined. The results are shown in Table 10.

TABLE 10

| Examples | Hardened coats | |
|---|---|---|
| (Coating compositions) | Angle of (static) contact with water | Resistance to carbon staining |
| Example 20 | 54° | ○ |
| Example 21 | 17° | ○ |
| Comp. Example 9 | 62° | X |
| Example 22 | 56° | Δ |
| Example 23 | 57° | ○ |
| Example 24 | 59° | ○ |
| Comp. Example 10 | 73° | X |
| Example 25 | 64° | X |
| Example 26 | 47° | Δ |
| Example 27 | 44° | Δ |
| Comp. Example 11 | 59° | X |
| Example 28 | 54° | X |
| Comp. Example 12 | 56° | X |
| Comp. Example 14 | 57° | X |

(Note) Resistance to carbon staining:
A few drops of 10% water dispersion of carbon black were applied on the coat surface and left at room temperature for 24 hours to dry. Then, the coat surface was washed with water and the traces of the applied carbon black dispersion were visually observed.
○: No traces were found.
Δ: There were slight traces.
X: There were extensive traces.

Further, the coats of Examples 20 to 23 and 26 to 28 and Comparative Examples 9, 11, 12 and 14 were subjected to a one-month outdoor exposure test (conducted from Nov. 26 through Dec. 26, 1997, on the roof of the Mitsubishi Chemical Corporation's Kurosaki Plant Development Center building at Kurosaki, Yawatanishi-ku, Kitakyushu-shi, Japan). The results are shown in Table 11.

TABLE 11

| Examples (Coating compositions) | Outdoor exposure test results |
|---|---|
| Example 20 | ○: No change |
| Example 21 | ○ No change |
| Comparative Example 9 | X: Severe rain streak stains, and partial exfoliation of the coat |
| Example 22 | X: Severe rain streak stains |
| Example 26 | Δ: Slight rain streak stains |
| Example 27 | ○: No change |
| Comparative Example 11 | X: Severe rain streak stains |
| Example 28 | X: Severe rain streak stains |
| Comparative Example 12 | X: Severe rain streak stains |
| Comparative Example 14 | X: Severe rain streak stains |

Preparation of Aqueous Emulsion-Forming Compositions

Example 29

The siloxane compounds H, B, N and L obtained in Example 8 and Comparative Examples 1 and 3, a hydrophobic organic solvent and a nonionic surfactant (polyoxyethylene nonylphenyl ether type; HLB=12) were mixed at room temperature to prepare the aqueous emulsion-forming compositions E to I. The blend composition and liquid appearance are shown in Table 12.

TABLE 12

| Aqueous emulsion-forming compositions | Blend composition (parts by weight) | | | Liquid appearance |
|---|---|---|---|---|
| | Siloxane compound | Hydrophobic organic solvent | Surfactant | |
| E | H 50 | Mineral spirit 50 | 15 | Homogeneous and transparent |
| F | H 50 | Ethylcyclohexane 50 | 15 | Homogeneous and transparent |
| G | B 50 | Ethylcyclohexane 50 | 15 | Homogeneous and transparent |
| H | L 50 | Ethylcyclohexane 50 | 15 | Homogeneous and transparent |
| I | L 100 | Not added 0 | 15 | Homogeneous and transparent |

Confirmation of Emulsion Particle Size of Aqueous Emulsion-Forming Compositions

Example 30

Figure 2:
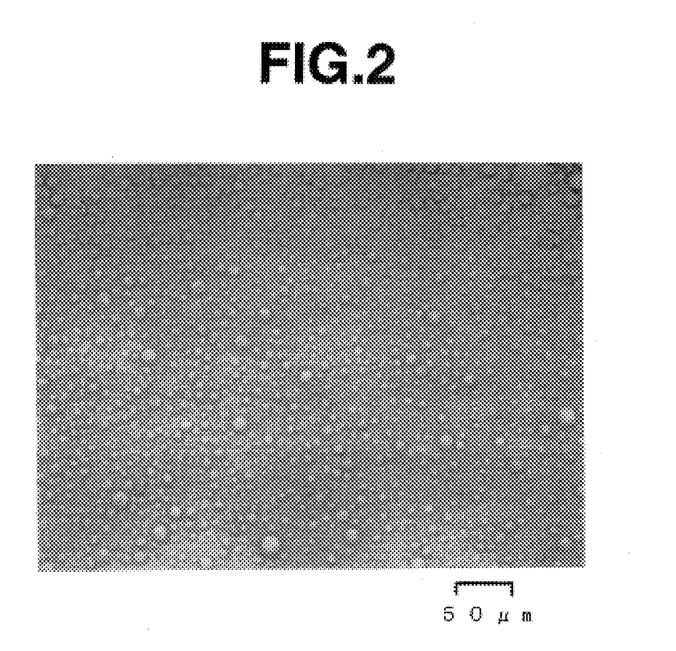
FIG. 2 is a microphotograph of the emulsion obtained in Example 30.

20 parts by weight of the aqueous emulsion-forming composition of Example 29 and 100 parts by weight of water were supplied into a 200-ml capped glass bottle and shaken for 15 minutes by a shaker to prepare an emulsion. Observing the morphology of this emulsion by a transmission differential interference microscope, it was confirmed that the emulsion was composed of the spherical particles of not more than 20 microns. FIG. 2 is a microphotograph of this emulsion.

Test of Addition to Existing Water-Based Coating

Examples 31 to 40 and Comparative Examples 16 to 22

The aqueous emulsion-forming compositions E to I prepared in Example 3 and the siloxane compounds H, B, N and L were blended in the existing water-based coatings and shaken for 15 minutes by a shaker to prepare the coating compositions. The blend composition and the results of the storage stability test on the obtained coating compositions are shown in Table 13.

The existing water-based coatings used in the test were:

New Glostar (trade name, produced by Kansai Paint Co., Ltd.); a reaction-curing acrylic resin coating, nonvolatiles=52 wt %

Ales Aqua Gloss (trade name, produced by Kansai Paint Co., Ltd.); a reaction-curing urethane resin coating, nonvolatiles=58 wt %

Ales Aquarethane (trade name, produced by Kansai Paint Co., Ltd.); nonvolatiles=56 wt %

TABLE 13

| Examples (Coating composition) | Blend composition (parts by weight) | | Siloxane compound/ non-volatiles of the coating | Storage stability (left at room temperature for 2 months) |
| --- | --- | --- | --- | --- |
| | Aqueous emulsion-forming compositions | Existing water-based coatings | | |
| Example 31 | E 8.0 | New Glostar 100 | 6.7/100 | Good |
| Example 32 | F 8.0 | New Glostar 100 | 6.7/100 | Good |
| Example 33 | F 34.5 | New Glostar 100 | 26.8/100 | Thickened |
| Comp. Example 16 | — | New Glostar 100 | — | Good |
| Example 34 | Siloxane compound H 3.5 | New Glostar 100 | 6.7/100 | Gelled in 5 days |
| Example 35 | F 8.0 | Aqua Gloss 100 | 6.0/100 | Gelled in 10 days |
| Example 36 | F 34.5 | Aqua Gloss 100 | 25.9/100 | Gelled in 5 days |
| Comp. Example 17 | — | Aqua Gloss 100 | — | Good |

TABLE 14

| Examples (Coating composition) | Blend composition (parts by weight) | | Siloxane compound/ non-volatiles of the coating | Storage stability (left at room temperature for 2 months) |
| --- | --- | --- | --- | --- |
| | Aqueous emulsion-forming compositions | Existing water-based coatings | | |
| Example 37 | Siloxane compound H 3.5 | Aqua Gloss 100 | 6.0/100 | Gelled in one day |
| Example 38 | G 8.0 | Aqua-rethane 100 | 6.2/100 | Good |
| Example 39 | G 34.5 | Aqua-rethane 100 | 26.8/100 | Gelled in 10 days |
| Comp. Example 18 | — | Aqua-rethane 100 | — | Good |
| Example 40 | Siloxane compound B 3.5 | Aqua-rethane 100 | 6.2/10 | Good |
| Comp. Example 19 | Siloxane compound L 3.5 | Aqua-rethane 100 | 6.2/100 | Gelled in several hours (uncoatable) |
| Comp. Example 20 | I 4.0 | Aqua-rethane 100 | 6.2/100 | Gelled in one day |
| Comp. Example 21 | H 8.0 | Aqua-rethane 100 | 6.2/100 | Thickened |
| Comp. Example 22 | Siloxane compound N 3.5 | Aqua-rethane 100 | 6.2/100 | Gelled in several hours (uncoatable) |

Evaluation of Coats

These coating compositions were applied on a SUS 304 plate by an applicator and hardened, and the properties of the obtained coats (30 to 50μ thick) were evaluated. The angle of static contact of these coats with water and resistance to carbon staining were determined. The results are shown in Table 15.

TABLE 15

| Examples (Coating compositions) | Hardened coat | |
| --- | --- | --- |
| | (Static) contact with water | Resistance to carbon staining |
| Example 31 | 52° | ○ |
| Example 32 | 50° | ○ |
| Example 33 | 48° | ○ |
| Comparative Example 16 | 62° | X |
| Example 34 | 56° | Δ |
| Example 35 | 49° | ○ |
| Example 36 | 35° | ○ |
| Comparative Example 17 | 73° | X |
| Example 37 | 64° | X |
| Example 38 | 33° | Δ |
| Example 39 | 26° | ○ |
| Comparative Example 18 | 59° | X |
| Example 40 | 54° | X |
| Comparative Example 20 | 56° | X |
| Comparative Example 21 | 56° | X |

(Note) Resistance to carbon staining:
A few drops of 10% water dispersion of carbon black were applied on the coat surface and left at room temperature for 24 hours to dry. Then, the coat surface was washed with water and the traces of carbon black were visually observed.
○: No traces were found.
Δ: There were slight traces.
X: There were extensive traces.

Further, the coats of Examples 31 to 34 and 38 to 40 and Comparative Examples 16, 18, 20 and 21 were subjected to a one-month outdoor exposure test (conducted from Nov. 26 through Dec. 26, 1997, on the roof of the Mitsubishi Chemical Corporation's Kurosaki Plant Development Center building at Kurosaki, Yawatanishi-ku, Kitakyushu-shi, Japan). The results are shown in Table 16.

TABLE 16

| Examples (Coating compositions) | Outdoor exposure test results |
| --- | --- |
| Example 31 | ○: No change |
| Example 32 | ○: No change |
| Comparative Example 16 | X : Severe rain streak stains, and partial exfoliation of the coat |
| Example 34 | X: Severe rain streak stains |
| Example 36 | Δ: Slight rain streak stains |
| Example 38 | ○: No change |
| Comparative Example 18 | X: Severe rain streak stains |
| Example 40 | X: Severe rain streak stains |
| Comparative Example 20 | X: Severe rain streak stains |
| Comparative Example 21 | X: Severe rain streak stains |

INDUSTRIAL APPLICABILITY

The coat-forming compositions and coating compositions containing the polyalkoxysiloxane compounds of the present invention, as compared with those containing the conventional polyalkoxysiloxane compounds, are quite epochal in that they are capable of providing the functions such as stain resistance, scratch resistance and heat resistance to the obtained coat without impairing storage stability and compatibility.

Also, the aqueous emulsion-forming compositions of the present invention, in comparison with those obtained by blending a conventional polyalkoxysiloxane compound in an existing water-based coating, have high storage stability in the liquid state and also excel in providing the functions such as stain resistance and weather resistance to the obtained coat.

What is claimed is:

1. Polyalkoxysiloxane compounds represented by the formula: $SiO_x(OR^1)_y(OR^2)_z$, wherein $z/(y+z)=0.05$ to 0.5 by mole, $0.5 \leq x \leq 1.5$, $2x+y+z=4$, $R^1$ is a methyl group, an ethyl group or both thereof, and $R^2$ is an organic group different from $R^1$.

2. Polyalkoxysiloxane compounds represented by the formula: $SiO_x(OR^1)_y(OR^2)_z$, wherein $0.5 \leq x \leq 1.5$, $2x+y+z=4$, $R^1$ is a methyl group, an ethyl group or both thereof, and $R^2$ is at least one of the alkyl groups having 3 to 4 carbon atoms.

3. Polyalkoxysiloxane compounds according to claim 1 or 2, having a weight-average molecular weight of 260 to 5,000.

4. Polyalkoxysiloxane compounds according to claim 3, having a viscosity of 3 to 500 cp at 25° C.

5. Polyalkoxysiloxane compounds according to claim 3, wherein $R^1$ is a methyl group and $R^2$ is a n-butyl group.

6. Polyalkoxysiloxane compounds having a haze factor A of not more than 2.0.

7. Polyalkoxysiloxane compounds according to claim 3, having a tetramethoxysilane content of not more than 1% by weight.

8. Coat-forming compositions containing a polyalkoxysiloxane compound according to claim 3.

9. A process for producing a coating composition, which comprises blending a polyalkoxysiloxane compound according to claim 3 in a coating.

10. An aqueous emulsion-forming composition comprising component (A) of a polyalkoxysiloxane compound represented by the formula $SiO_a(OR^1)_b(OR^2)_c$; wherein $0.5 \leq a \leq 1/4$, $c/(b+c)=0.05$ to 0.5, $2a+b+c=4$, $R^1$ is a methyl group or an ethyl group, and $R^2$ is an organic group different from $R^1$, and component (B) of a nonionic surfactant.

11. An aqueous emulsion-forming composition according to claim 10, wherein the HLB value of the nonionic surfactant used as component B is not less than 8.0.

12. An aqueous emulsion composition comprising a blend of an aqueous emulsion-forming composition according to claim 10 or 11; and an aqueous resin, water or mixture thereof.

13. A coating composition comprising an aqueous emulsion-forming composition according to claim 10 or 11; a pigment, a powder, or mixture thereof; and an aqueous resin, water or mixture thereof.

14. An aqueous emulsion-forming composition comprising:

component (A) of a polyalkoxysiloxane compound represented by the formula $SiO_a(OR^1)_b(OR^2)_c$, wherein $0.5 \leq a \leq 1.4$, $c/(b+c)=0.05$ to 0.5, $2a+b+c=4$, $R^1$ is a methyl group or an ethyl group, and $R^2$ is an organic group different from $R^1$;

component (B) of an organic solvent having a solubility parameter (SP) of not more than 9.5; and component (C) of a nonionic surfactant.

15. An aqueous emulsion-forming composition according to claim 14, wherein the HLB value of the nonionic surfactant used as component (C) is not less than 8.0.

16. An aqueous emulsion composition comprising a blend of an aqueous emulsion-forming composition according to claim 14 or 15; and an aqueous resin, water or mixture thereof.

17. A coating composition comprising an aqueous emulsion-forming composition according to claim 14 or 15; a pigment, a powder, or mixture thereof; and an aqueous resin, water or mixture thereof.

* * * * *